United States Patent [19]

Adler

[11] Patent Number: 5,359,331
[45] Date of Patent: Oct. 25, 1994

[54] MONOSTATIC RADAR SYSTEM HAVING A ONE-PORT IMPEDANCE MATCHING DEVICE

[75] Inventor: Zdenek Adler, West Hempstead, N.Y.

[73] Assignee: General Microwave Corporation, Amityville, N.Y.

[21] Appl. No.: 919,833

[22] Filed: Jul. 27, 1992

Related U.S. Application Data

[63] Continuation-in-part of Ser. No. 553,890, Jul. 13, 1990, Pat. No. 5,134,411.

[51] Int. Cl.⁵ ............................................. G01S 7/03
[52] U.S. Cl. ................................. 342/124; 342/198; 333/124
[58] Field of Search .................. 342/124, 198, 165; 333/33, 124

[56] References Cited

U.S. PATENT DOCUMENTS

| | | |
|---|---|---|
| 2,147,810 | 2/1939 | Alford .................................. 342/128 |
| 3,112,481 | 11/1963 | Goldberg ........................ 342/128 X |
| 3,150,367 | 9/1964 | Harrington ......................... 342/128 |
| 3,789,398 | 1/1974 | Erst ..................................... 342/128 |
| 4,044,354 | 8/1977 | Bosher et al. ................... 342/130 X |
| 4,349,823 | 9/1982 | Tagami et al. .................. 343/7 VM |
| 4,354,192 | 10/1982 | Kohler ................................ 342/128 |
| 4,359,902 | 11/1982 | Lawless ............................... 342/124 |
| 4,458,530 | 7/1984 | Bastida ............................... 342/124 |
| 4,725,842 | 2/1988 | Mayberry ........................... 342/198 |
| 4,825,214 | 4/1989 | Dejaegher ........................ 342/128 |
| 4,901,083 | 2/1990 | May et al. ......................... 342/128 |
| 4,968,967 | 11/1990 | Stove .................................. 342/165 |
| 4,970,519 | 11/1990 | Minnis et al. ...................... 342/165 |

OTHER PUBLICATIONS

Jacobson et al. "Microwave Distance Mekr with ±2.5mm Resolution" Conf. 5th European Microwave, Hamburg, Germany Sep. 1975.

*Primary Examiner*—Gilberto Barrón, Jr.
*Attorney, Agent, or Firm*—Velope & Koenig

[57] ABSTRACT

A monostatic frequency modulator continuous wave radar for detecting and determining the distance to near range objects. A temperature compensated one port Z-network is provided to generate a voltage of equal magnitude and opposite sign to that of the voltage reflected from the antenna.

21 Claims, 26 Drawing Sheets

MONOSTATIC RADAR SYSTEM HAVING A ONE-PORT IMPEDANCE MATCHING DEVICE

This application is a continuation-in-part of application No. 553,890, filed Jul. 13, 1990; anticipated to be U.S. Pat. No. 5,134,411 issued Jul. 28, 1992.

BACKGROUND OF THE INVENTION

This invention relates generally to obstacle detection and ranging systems and more specifically to near range obstacle detection systems. The following are a few of the applications in which such a near range obstacle detection system may be used:

Vehicular obstacle detection and headway control
Autonomous tele-operated vehicle obstacle detection
Space robotics
Control of work platforms and forklifts
Terrain mapping through vegetation
Weapons fusing
Battlefield surveillance
Tank gauging (determining the amount of a substance stored in a container)
Marine vessel docking and guidance
Airplane auto-docking
Personnel bridge docking
Airport runway incursion
Altimeter
Presence sensor four traffic light control
Ice thickness measurement
Pavement thickness measurement
Buried object detection
Underground tunnel or void detection
Perimeter security surveillance
Aid to the handicapped Some prior art near obstacle detection systems utilize infrared and ultrasonic radiation. These systems generally have disadvantages that discourage their use.

Microwave radiation on the other hand is commonly used in a variety of forms of radar systems, and the advantages of microwave radar technology make it attractive for near obstacle detection systems as well. See the article "Automotive Radar: A Brief Review" by D. M. Grimes and T. O. Jones in Proceedings of the IEEE, June, 1974, pp. 804–822 and the relevant prior art literature cited therein.

An important microwave operating band assigned for radar use, generally designated as X-band, covers the frequency range from 8.2 to 12.4 GHz. In this frequency range, microwave components are reasonable in both size and cost. For example, the dimensions of an X-band planar or patch antenna, suitable for near obstacle detection, are approximately 1 inch×2 inches. A portion of X-band set aside by the Federal Communications Commission for unlicensed use covers the frequency range from 10.50 to 10.55 GHz. However, this limited bandwidth makes it difficult to achieve adequate resolution for nearby targets. For example, with a conventional frequency modulated-continuous wave (FM-CM) radar system operating over a 50 MHz bandwidth, the minimum resolution is approximately 10 feet, whereas a resolution of the order of inches is considered necessary for near obstacle detection such as vehicular warning systems.

Where antenna mounting space is at a premium, it is possible to utilize one antenna for both transmitting and receiving. This one antenna system is called a monostatic radar system. A major drawback of monostatic systems is the unwanted presence of an internally reflected signal from the antenna. Since the internally reflected signal may be an order of magnitude larger than the reflected signal from the target, the accurate detection of a target may not be possible in a narrow band system since the receiver detects the composite signal consisting of the internally reflected signal from the antenna as well as the reflected signal from the target.

An analogous situation occurs in bi-static or two antenna systems. The unwanted signal is due to the leakage between the two antennas. However this leakage signal is usually much smaller than the reflected antenna signal in the monostatic system. In most situations, the leakage signal can be ignored. However, in some cases, an active two-port phase shifter/attenuator or I-Q modulator is employed. This two-port device generates a signal of equal magnitude and opposite sign to that of the leakage signal, cancelling the leakage signal.

OBJECT OF THE INVENTION

It is among the objects of this invention to provide a new and improved system that can be utilized for near obstacle detection, tank/container gauging and ice thickness measurement.

Another object is to provide a new and improved microwave radar system useful as an obstacle detection system.

Another object is to provide a new and improved radar system for use with limited frequency bandwidth and having a sufficiently high resolution.

Another object is to provide a new and improved radar system for detecting the closest obstacle among multiple obstacles.

It is a further object to provide a monostatic radar system that can be utilized for near obstacle detection, tank/container gauging and ice thickness measurement.

SUMMARY OF THE INVENTION

The present invention provides an improved monostatic radar system for detecting near range obstacles and determining their distance. An active one-port impedance matching device (Z-network) or I-Q modulator is employed. A generated signal is directed to both the antenna and the device. The device reflects a pre-determined portion of that signal with a pre-determined phase change. The device cancels the reflected signal from the antenna.

In accordance with this invention an obstacle detection apparatus comprises: means for generating high frequency energy over a finite frequency range and for frequency modulating over a limited range of bandwidth such high frequency energy and for supplying said frequency-modulated (FM) high frequency energy to a first path providing a phase reference. A second path includes transmission and receiving sections, and the transmission section includes means for radiating the frequency modulated high frequency energy into space in the form of propagating waves, while the receiving section includes means for receiving a portion of said radiated energy after reflection from a remote object. The transmitting and receiving sections may be physically separated, as in bistatic radar systems, or may have a common antenna and signal path section as in monostatic systems. The radiated energy portion acquires a phase shift related to the distance traveled by said radiated energy and to the frequency of the radiated energy.

In one of said paths a means serves to phase shift frequency-modulated high frequency energy in that one path in a certain configuration of repeated cycles of frequency modulation to improve resolution attainable with said limited range of bandwidth. In the receiving section, means for comparing the phase of FM energy with the phase of the reflected radiated energy serves to produce signals related to the phase-shifts of said first and second paths and corresponding to the phase-shift produced over the distance travelled by the radiated energy portion and the reflection thereof from the remote object. A distance signal is derived in accordance with the phase states of said phase shifter and related to the frequencies of said energy generating and modulating means.

In accordance with an embodiment of this invention, the means for deriving a distance signal includes, means for transforming sinusoidal voltage wave from the time domain to the frequency domain including means for performing a Fourier analysis thereon. Also in accordance with an embodiment of this invention, the phase-shifting means is in the reference path.

BRIEF DESCRIPTION OF THE DRAWINGS

The foregoing and other objects of this invention as well as the invention itself may be more fully understood from the following description when read together with the accompanying drawings, in which corresponding parts are referenced by similar numerals throughout, and in which.

DETAILED DESCRIPTION OF THE INVENTION

Figure 1:
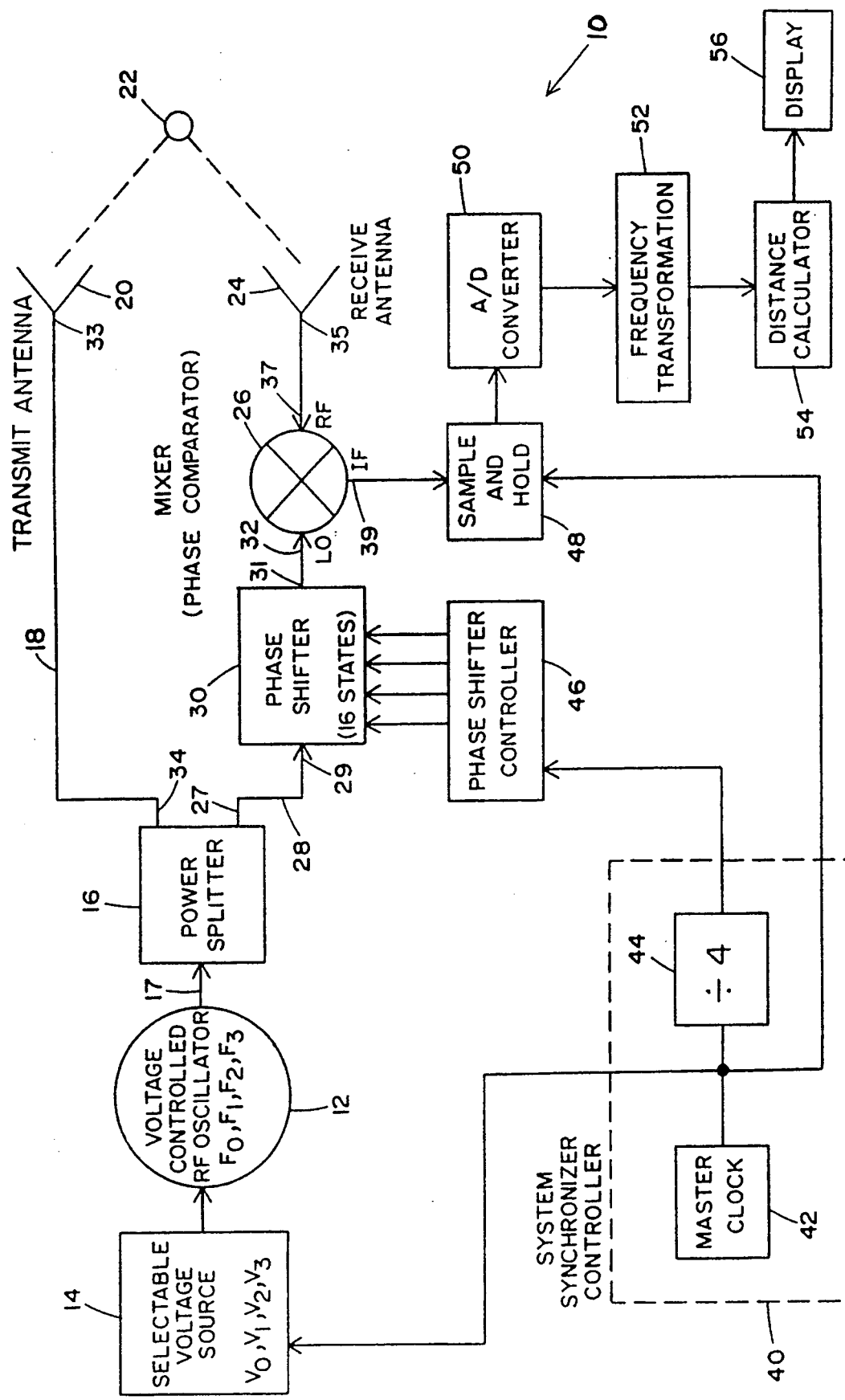
FIG. 1 is a schematic block diagram of a bi-static obstacle detection and warning system embodying this invention.

In the system 10 of FIG. 1 for radar ranging, a voltage-controlled oscillator 12 (VCO) generates the basic RF signal as a continuous wave (CW) with a periodic frequency modulation (FM) superimposed in accordance with a periodic modulating voltage from a selectable source 14.

The RF voltage from the VCO 12 is applied via a power splitter 16 and transmitting RF path 18 to a transmitting antenna 20. The latter radiates a corresponding electromagnetic wave to a remote target 22, and the radiation reflected from the target returns to a receiving antenna 24. The reflected RF signal is supplied to the RF input of a mixer 26. Another RF path 28 from the power splitter 16 supplies the FM-CW signal to a phase shifter 30, which shifts the phase of that signal in a certain periodic configuration and applies the phase-shifted signal to the LO (local oscillator) input 32 of the mixer 26.

Voltage Controlled Oscillator—The frequency of the VCO 12 is determined by the applied control voltages $V_0$, $V_1$, $V_2$, $V_3$, from the source 14 and can be varied over the operating band in several ways. Among them are:

a. Continuously increasing or decreasing frequency over a fixed period T. This is usually referred to as a linear frequency-modulated continuous wave (linear FM-CW) signal. This type of frequency modulation can be used with either an analog or digital signal processing system.

b. Step-wise increasing frequency is preferable for the digital signal processing approach. For optimum signal processing efficiency, the generated frequencies should be equally spaced.

Figure 6A:
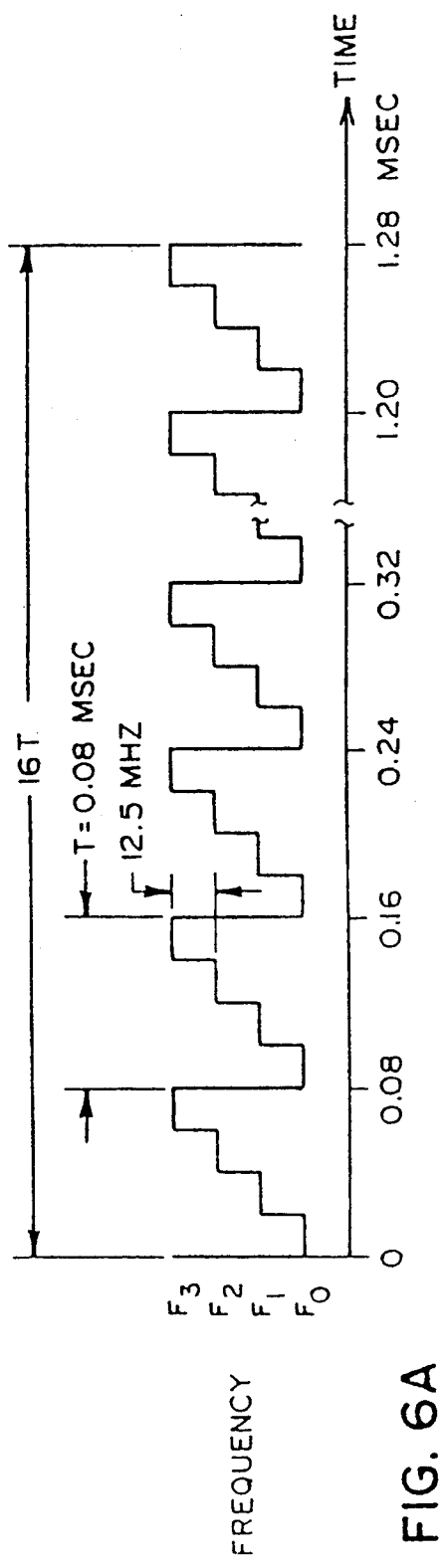
FIGS. 6A, 6B, and 6C are idealized timing and waveform diagrams illustrating the operation of parts of the system of FIG. 1
Figure 6B:
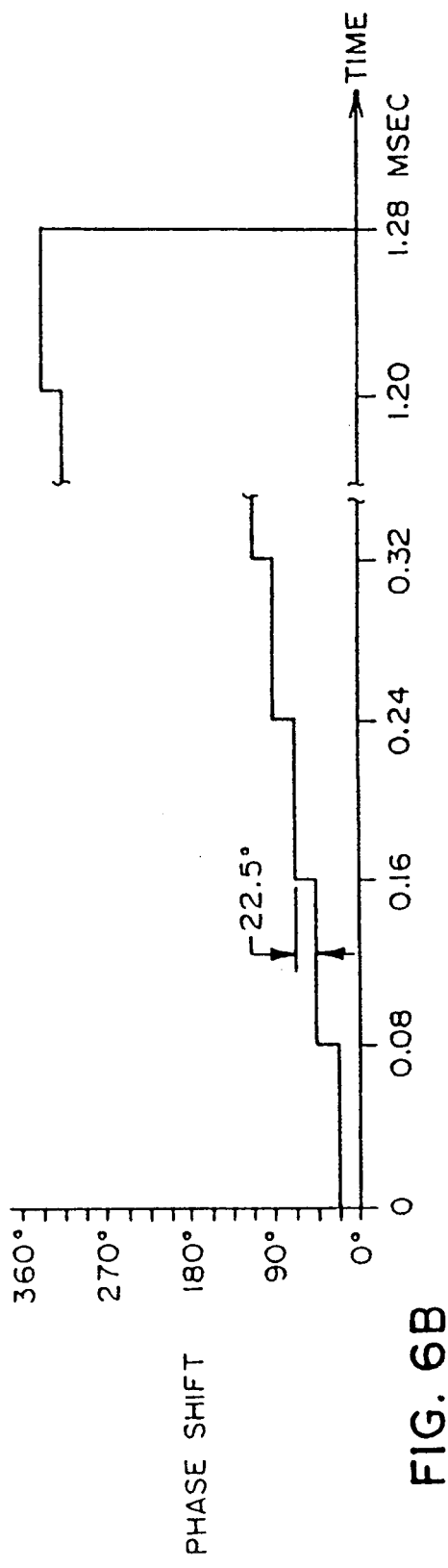
Figure 6C:
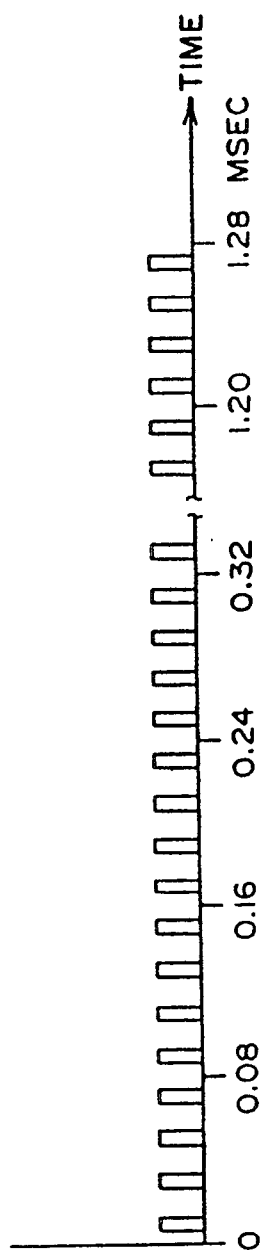
Figure 8:
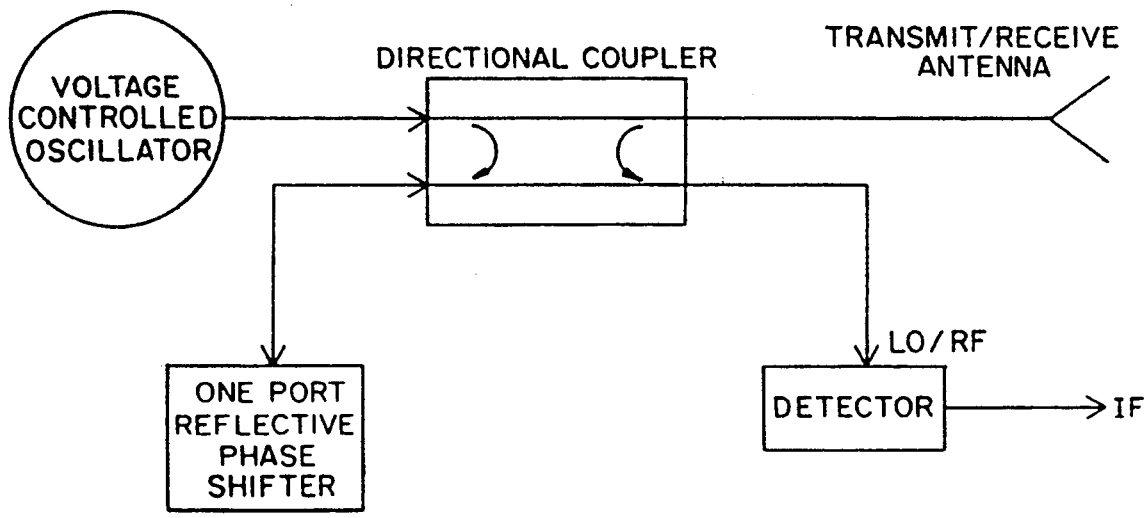
Figure 9:
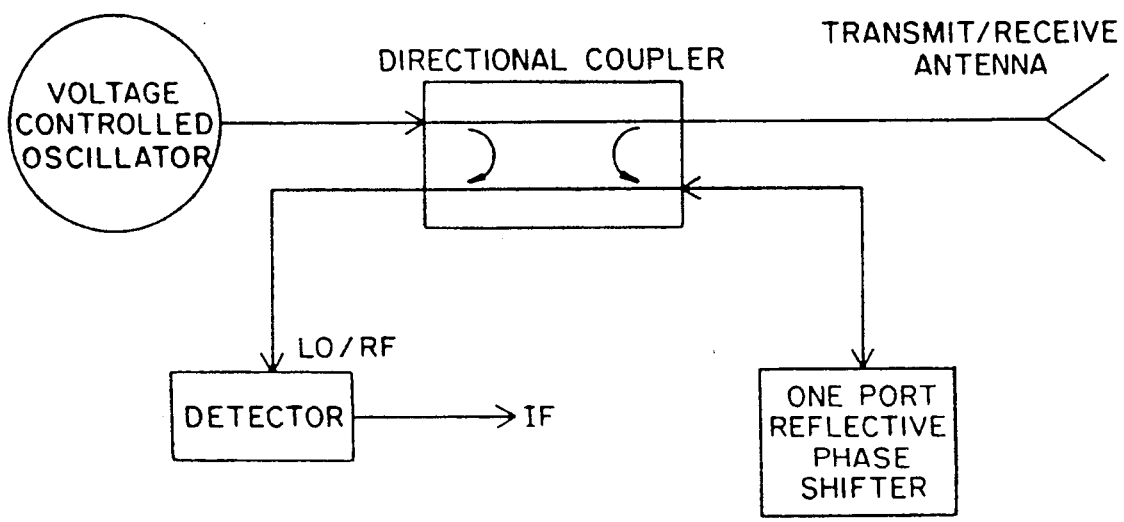
Figure 10:
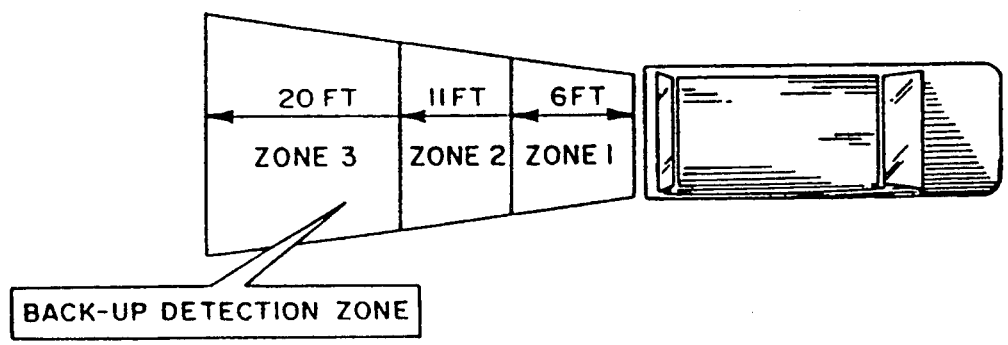
FIG. 10 is a schematic diagram showing zones in which targets subject to monitoring are located in relation to an over-the-road vehicle.

The present best mode of the invention uses the step-wise frequency modulation scheme. Four frequencies are generated during each period. They are spaced 12.5 MHz apart, beginning at 10.5 GHz and ending at 10.5375 GHz. Each frequency state is energized for a period of 0.02 msec. Therefore, each frequency sweep period has a 0.08 msec duration as shown in FIGS. 6A through 6C.

Power Splitter—The power splitter 16 is a 3-port device (e.g. a Wilkinson power divider or a quadrature coupler with the isolated port terminated). The energy of the signal at the input port 17 is split equally between output ports 27 and 34. The phase difference between the signals at these ports must not change significantly for any of the frequencies at which the system operates. The actual value of the phase difference is not important to the function of the system.

Transmitting and Receiving Antennas—The signal energizing the transmitting antenna 20 at its input port 33 is transmitted with a directional pattern determined by the geometry of the antenna. Part of the signal is scattered with an undetermined pattern and amplitude from an object 22. Some of that scattered energy will appear at the receiving antenna 24 and is available at port 35. The amplitude of the received signal depends on (i) the directional (gain) patterns of both antennas, (ii) the transmitting range from antenna 20 to target 22, (iii) the scattering characteristics of the target 22 and (iv) their range from target 22 to receiving antenna 24.

The directional patterns of both antennas 20 and 24 and their relative location and orientation should be such that the magnitude of the leakage signal propagating directly between the antennas, that is between the points 33 and 35, should be minimized.

Mixer—The mixer 26 (or phase comparator) can be either a 2-or 3-port device. The latter version has been employed in the present embodiment. The 3-port device (e.g. a double balanced mixer) has reference, input and output ports 32, 37 and 39, respectively. They are also commonly referred to as the LO, RF and IF ports respectively. (In the 2-port device, e.g., a single-balanced mixer, the LO, and RF ports use a single port).

In this embodiment, the function of the mixer 26 is essentially that of a "two-quadrant" phase comparator. As such, the voltage at output port 39 IF is a sinusoidal function of the phase difference between $\theta_{ref}$, the phase of the voltage at the reference point 32, and $\theta_{inp}$, the phase of the voltage at the input port 37. Mathematically, this function is:

$$V_{out} = a \sin(\theta_{ref} - \theta_{inp}) + b$$

where "a" is device-dependent voltage scaling factor, and "b" is a fixed residual offset voltage. For the purpose of demonstrating the function of the system, the residual offset voltage be assumed to be zero. Consequently, if the voltages at the input and output ports are either in phase (0° difference) or out of phase (180° difference), then the voltage at the output port will be zero. Likewise for phase differences of +90° and -90° the output voltages are +a and -a respectively. For all other phase differences, the output voltage varies between +a and -a in a sinusoidal fashion.

Phase Shifter—The phase shifter 30 is an insertable 2-port device. With the device energized at the input port 29, the phase of the RF voltage at the output port 31 can be changed by means of a signal applied to the control port. The range over which the phase can be changed is 360°, and it can be changed either continuously, as in an analog phase shifter, or in a fixed number of steps, as in a digitally controlled phase shifter. For a fixed control signal, the phase change must not vary significantly over the system operating band.

In this embodiment of the radar system, the phase shifter 30 is digitally controlled. The phase of the signal at the output port can be set to any one of the 16 equally spaced 22.5° steps by means of a 4-bit digital control signal.

D/A Selectable Voltage Source—The selectable voltage source 14 sequentially applies one of four voltages to the VCO, each for a 0.02 msec duration. For a single operating period, the sequence of four voltages is repeated 16 times for a total duration of 1.28 msec. The timing is controlled by the system synchronizer/controller 40.

Phase Shifter Controller—The phase shifter controller 46 applies a 4-bit digital signal to the phase shifter 30. Each of the possible 16 phase steps lasts for a period of 0.08 msec, synchronized with the A/D selectable voltage source by means of the system synchronizer/controller. The total time interval required for all 16 phase states is 1.28 msec.

A/D Converter/Sampler—The A/D converter/sampler 50 samples the voltage at the output port of the mixer 26 every 0.02 msec and converts the sampled voltage into a 12-bit digital number (−2046 to +2045). A total of 64 samples is taken during the 1.28 msec period. The sampled data are stored in a digital form in Random Access Memory (RAM) for further signal processing.

System Synchronizer/Controller—The system synchronizer/controller's 40 function is to synchronize the three control components described above. A total of 64 data points is taken, which can be divided into 16 sequences of 4 data points, each sequence associated with one of the 16 phase states. The sequences can therefore be designated by their phase states. (A master clock 42 sets the basic repetition rate of the voltage source 14 with its clock signals divided down by counter 44, the repetition rate for the 16 phase states is set.)

The total acquisition time of the 64 data points is 1.28 msec. In the automotive application, where maximum relative speed between the antennas and an object does not exceed 12 inch/msec, any object can be considered essentially stationary during the acquisition period.

Focusing on the operation of two components, namely the power splitter 16 and the mixer 26 (phase comparator), two distinct signal paths can be traced between them:

a) a reference path 28, defined by terminal points 27, 29, 31 and 32; and b) an RF path, defined by terminal points 34, 33, (the target 22) 35 and 37.

Let us assume that the RF path is 10 ft. longer than the reference path (the target 22 is thus at a distance of about 5 feet). In air, the RF energy travels at the speed of $3 \times 10^8$ meters/sec, equal to about 1 ft/nsec. Thus, the time it takes the signal to travel through the RF path is 10 nsec longer than the time it takes the signal to travel through the reference path. This additional time is referred to as the time delay $\tau$.

The RF signal can be described as a rotating vector, with one complete rotation equivalent to one cycle. If the vector rotates only part of a cycle, then that segment of the cycle can be described in terms of a phase change, where 360° corresponds to a complete cycle.

In similar fashion the VCO signal at any given frequency can be described as a continuously rotating vector at a uniform speed, whose angular velocity is determined by the frequency of the signal. As an example, if the VCO is generating a signal at a frequency of 10.5 GHz, $(10.5 \times 10^9)$ cycles/sec, or 10.5 cycles/nsec) then the number of revolutions per nsec is 10.5.

At the beginning of each signal path, it is assumed that the reference and the RF signals are in phase. In other words, their vectors at points 27 and 34 are aligned and they are rotating at the rate of 10.5 cycles/nsec.

Let us examine what happens to the alignment of the reference and RF vectors at the end of their respective paths (terminal points 32 and 37). Since the RF signal takes 10 nsec longer to reach the end of the path, its associated vector will have made 105 more revolutions than the reference signal (10.5 revolutions/nsec). Nevertheless, both vectors will still have a zero net phase difference between them. Since the mixer 26 acts as a phase comparator, the output signal of the mixer, at point IF, remains at its zero phase state for as long as the frequency and the path length remain unchanged.

Now the case where the VCO frequency has been increased by 12.5 MHz, i.e., 10.5125 cycles/nsec, is considered. Consequently, in the same 10 nsec period there are 105.125 more cycles of the RF signal vector. Therefore, at points 32 and 37, the vectors are ⅛ cycle or 45° apart, and the vector of the output signal of the mixer moves from its zero state by 45°. Similarly, each time the VCO frequency is increased by 12.5 MHz, the vector of the output signal of the mixer 26 is moved by 45°.

In summary, when four frequencies are generated in the sequence $f_0$, $f_0+12.5$ MHz, $f_0+25$ MHz and $f_0+37.5$ MHz, the output vector moves through an angular range of 135° in 45° increments (⅜ of a cycle in ⅛ cycle increments). It should be evident that the angular range through which the output vector swings depends on the difference between the maximum and minimum frequency of the VCO. (The number of steps in which the VCO changes from minimum to maximum frequency does not affect the angular range of the output vector, except for a small quantization error related to the frequency increment).

Based on the foregoing, the signal at the output of the mixer 26 can be analyzed in terms of the information it may contain about the target. The angular range over which the output vector moves depends upon the delay of the RF signal (hence the target distance). Thus, by measuring the angular range of the output vector, the target distance can be deduced.

However, a problem arises when two or more targets are present. For each target we can define a separate RF path and an associated RF vector. The RF vectors may have various amplitudes and will span different angular ranges, depending on the related distances. Correspondingly, each associated output vector also may have various magnitudes and will rotate at different speeds. The picture is now more complex. Since vectors are actually superimposed on each other, the resultant vector will rotate at a non-uniform speed. In fact, it will exhibit a complex motion, changing directions and amplitude, with uneven increments, each time the VCO frequency is increased by 12.5 MHz.

If, however, each vector by itself traces out one or more full cycles during the VCO frequency sweep, it is then possible to "decompose" the resultant vector into individual component vectors. This decomposition procedure is known as "Fourier transformation". Provided the above condition is satisfied, we can obtain from the "trace" of the composite vector, via a fourier transformation, the number of full revolutions for each of the vector components. The locations of corresponding targets can be readily deduced from the number of full revolutions of the vector components. It should be evident that this condition applies only to targets to 10′, 20′, 30′, etc. For any other target locations, the individual output vectors do not complete an integral number of full cycles during the VCO sweeps, and, as it turns out, their distance cannot be resolved without an ambiguity.

This condition leads to a definition of the distance resolution. Resolution is defined by a distance needed to separate two targets, such that during the time the VCO frequency changes from minimum to maximum, the output vector associated with the further target will rotate one more cycle than the vector associated with the closer target. This condition is defined mathematically as:

$$\Delta r = c/\{2(f_{max}-f_{min})\}$$

where "c" is the propagation velocity.

As discussed above, for a case with 4 frequencies incremented by 12.5 MHz and a target at 5 feet (corresponding to time delay of 10 nsec), the angular excursion of the output vector is ⅜ of a cycle.

The output vector will move through the full cycle, if we increase the frequency bandwidth of the VCO by factor of 2. However, this is not a desirable solution.

The basic problem to be resolved is how to "force" the output vector to complete this cycle, so that as we repeat the sequence of VCO frequencies indefinitely, the output vector rotates in a uniform and continuous manner as the VCO continues to sweep.

Figure 2:
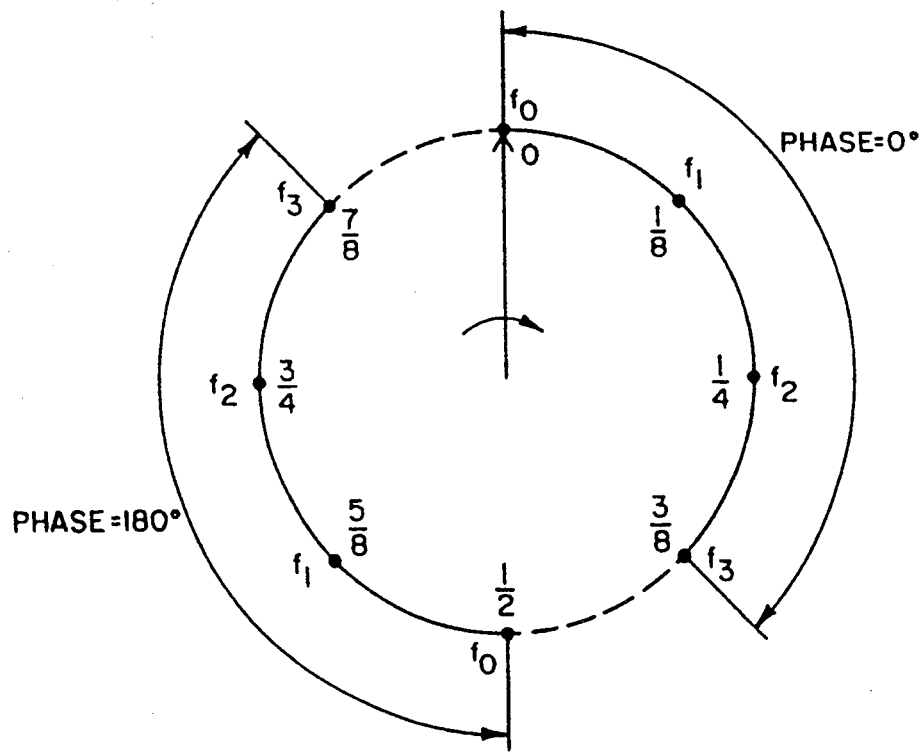
FIG. 2 is a schematic graphical diagram of rotating vectors illustrative of the operation of the system of FIG. 1.
Figure 7:
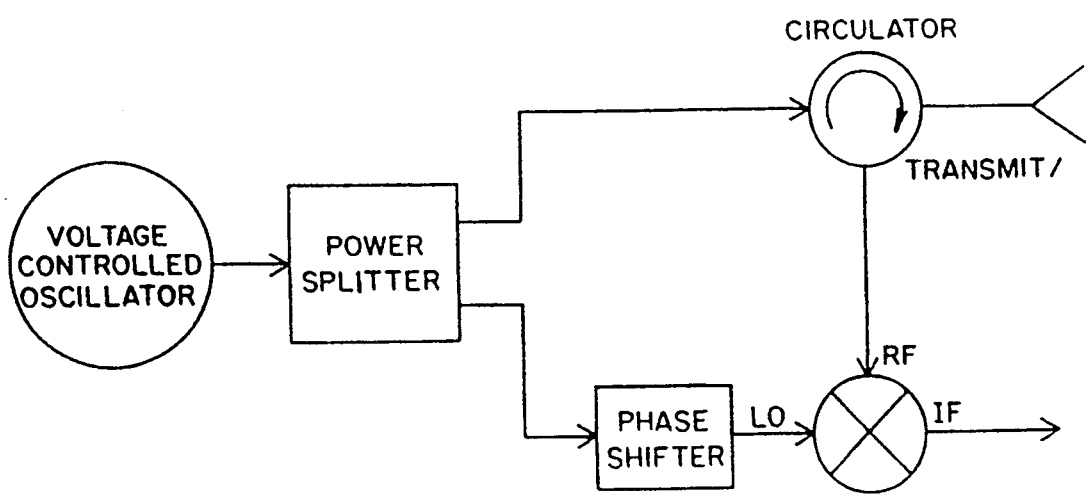
FIGS. 7, 8, and 9 are schematic block diagrams of modified forms of the invention.
Figure 3A:
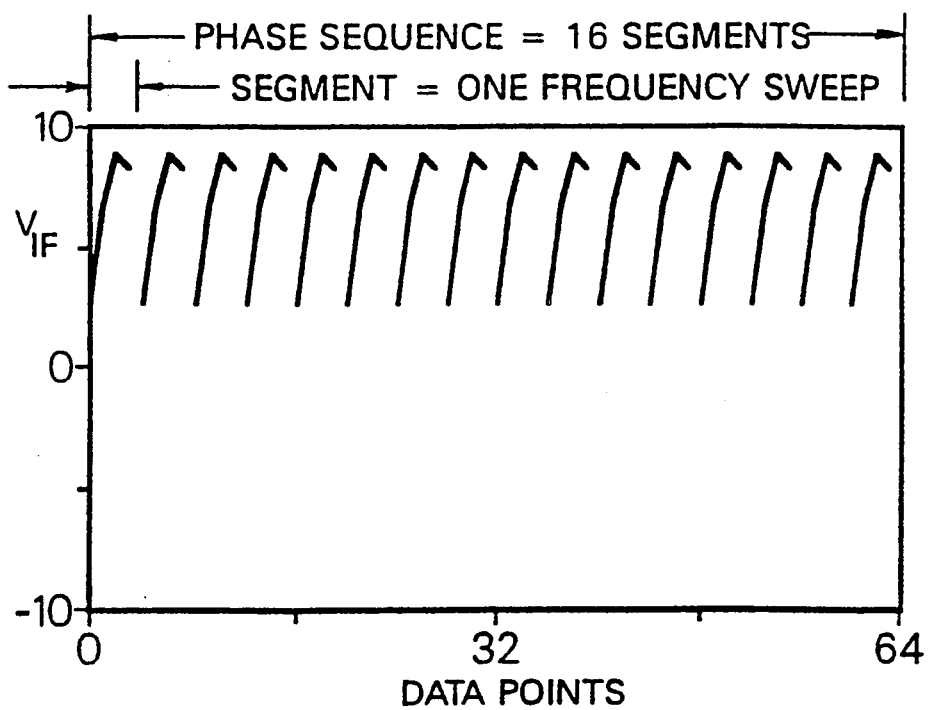
FIGS. 3-A through 3-P are 16 graphs, schematic diagrams serving as an example of signal data from the system of FIG. 1 and reconstructed in the process of FIG. 4A.
Figure 3B:
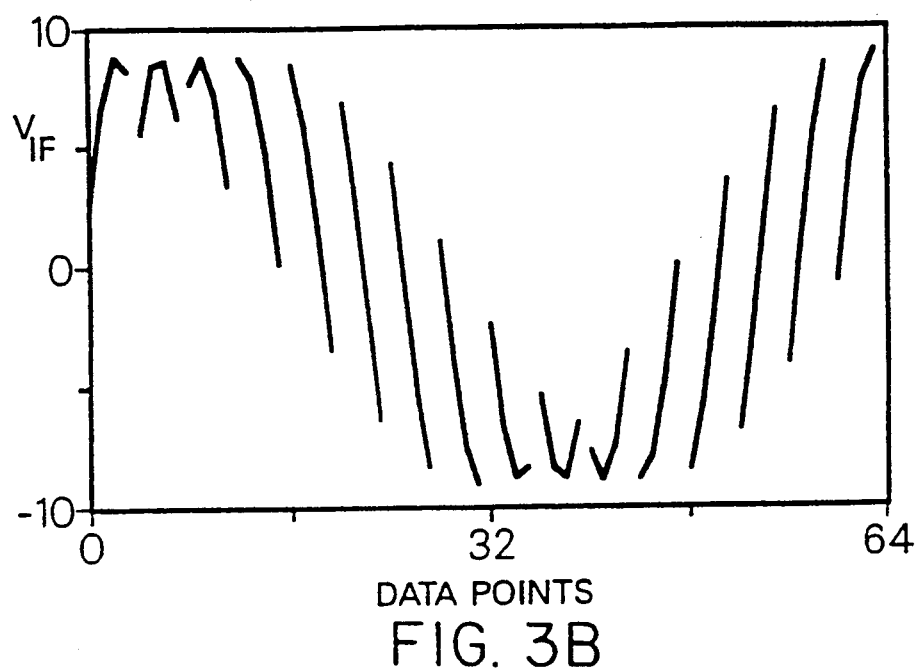
Figure 3C:
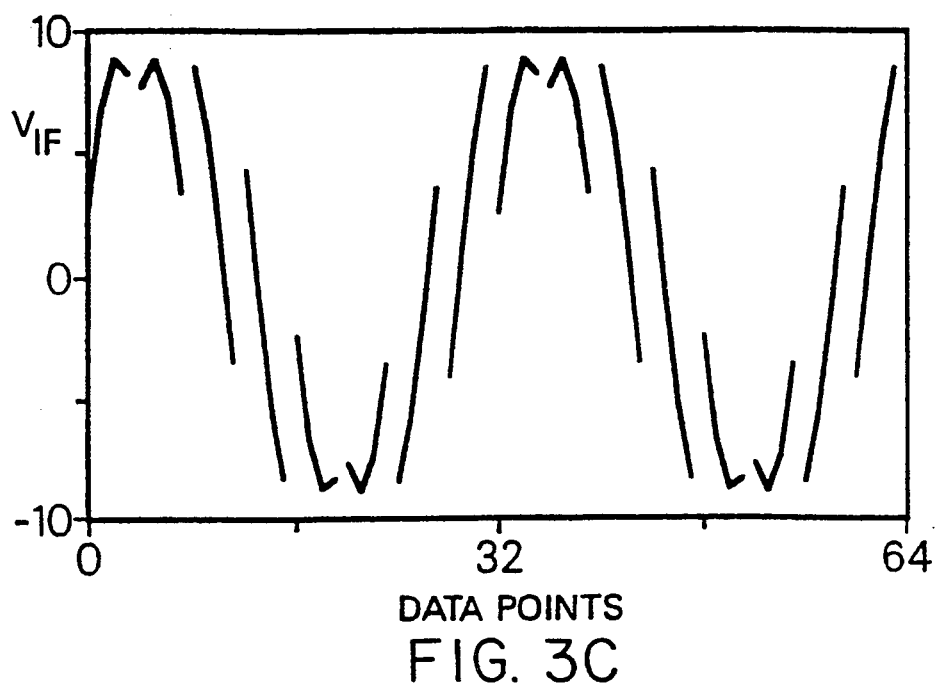
Figure 3D:
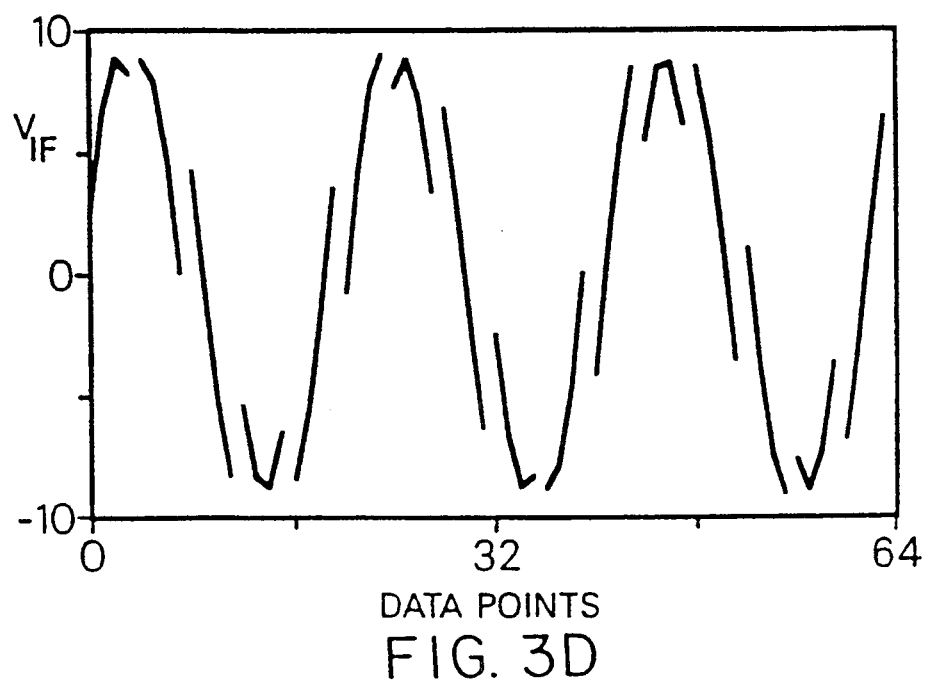
Figure 3E:
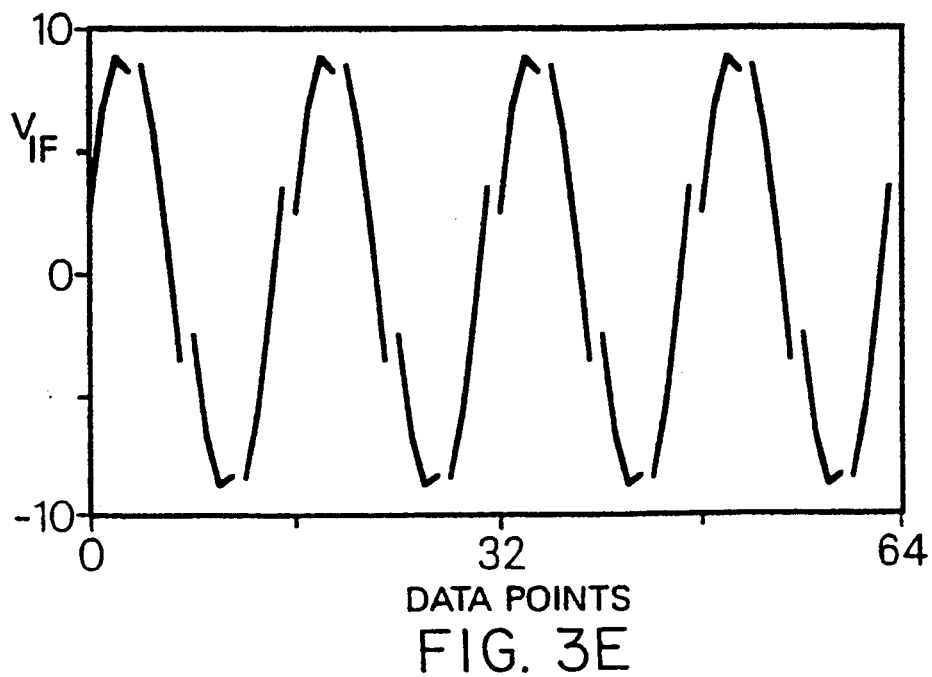
Figure 3F:
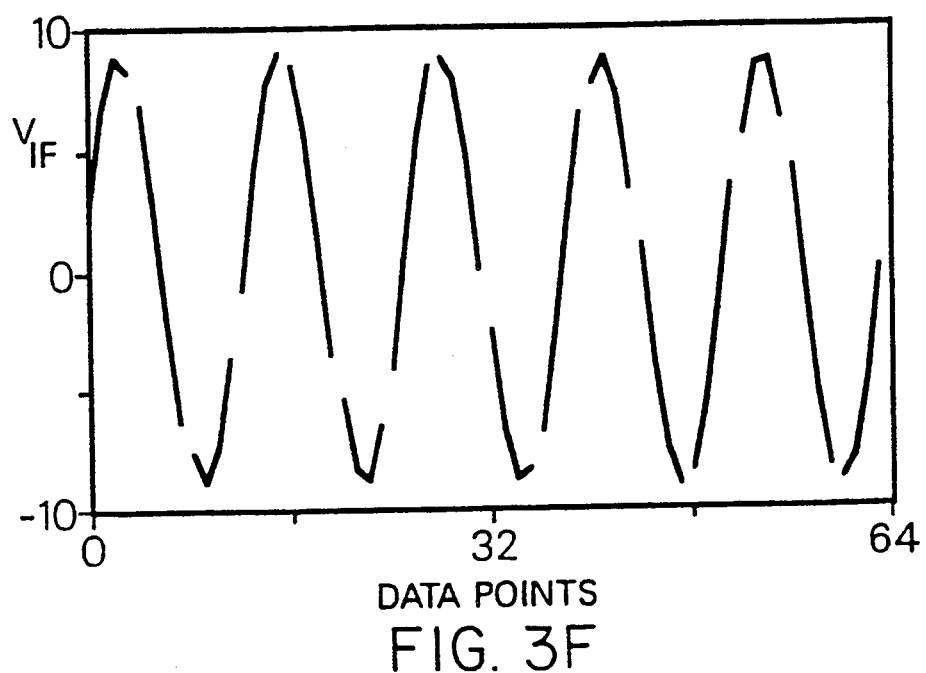
Figure 3G:
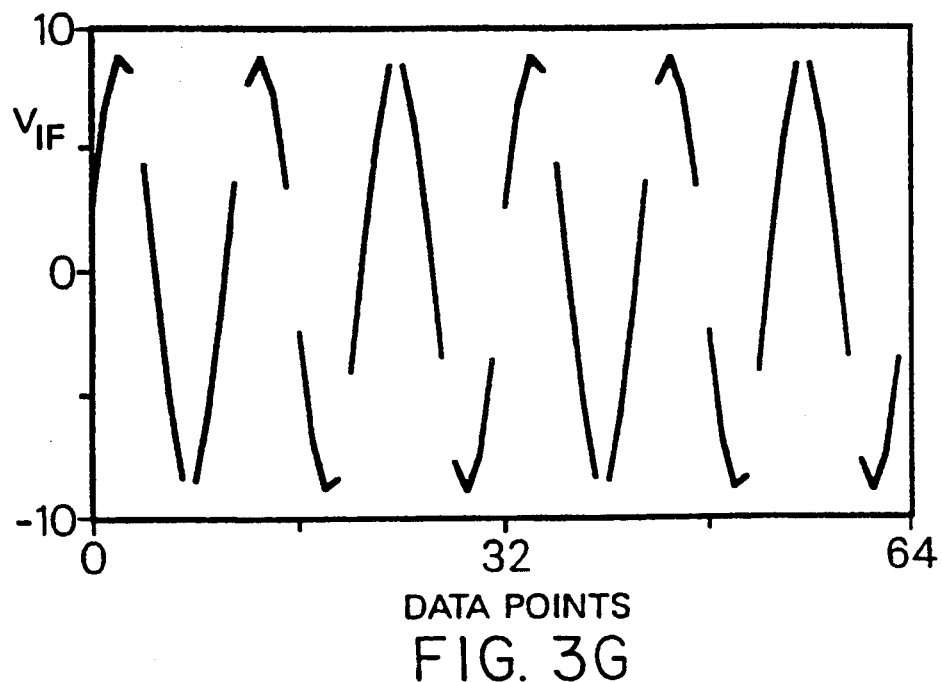
Figure 3H:
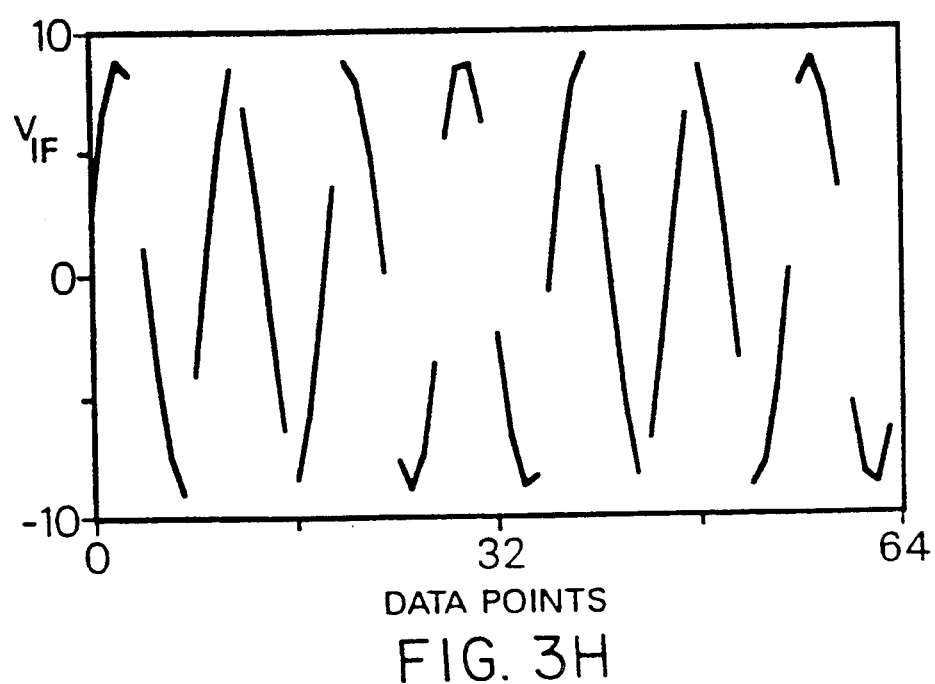
Figure 3I:
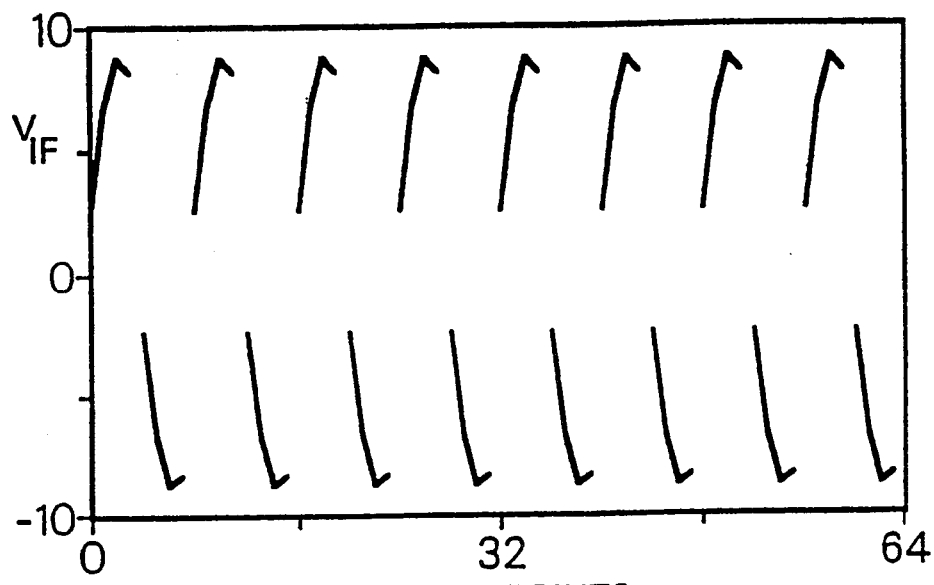
Figure 3J:
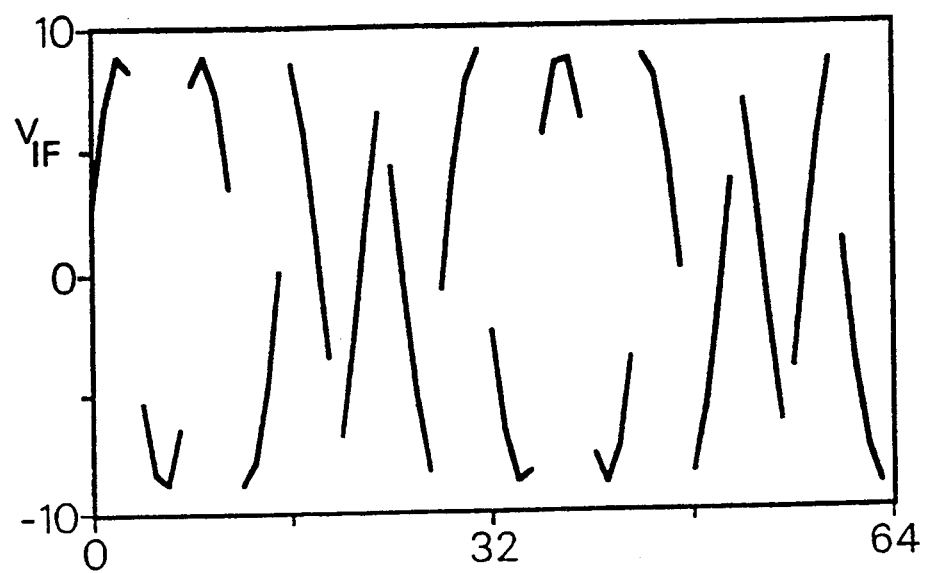
Figure 3K:
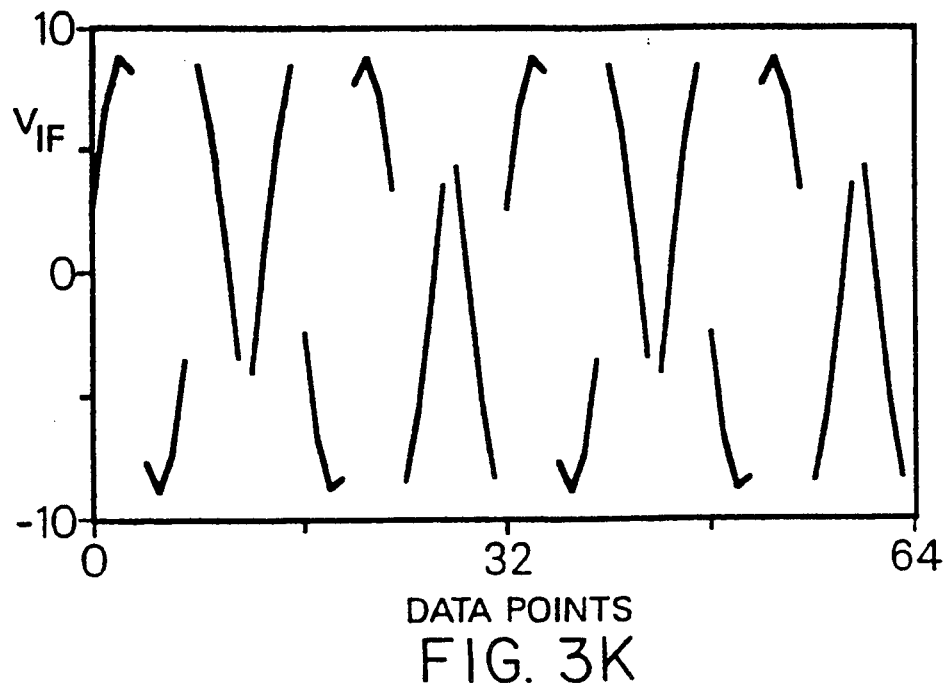
Figure 3L:
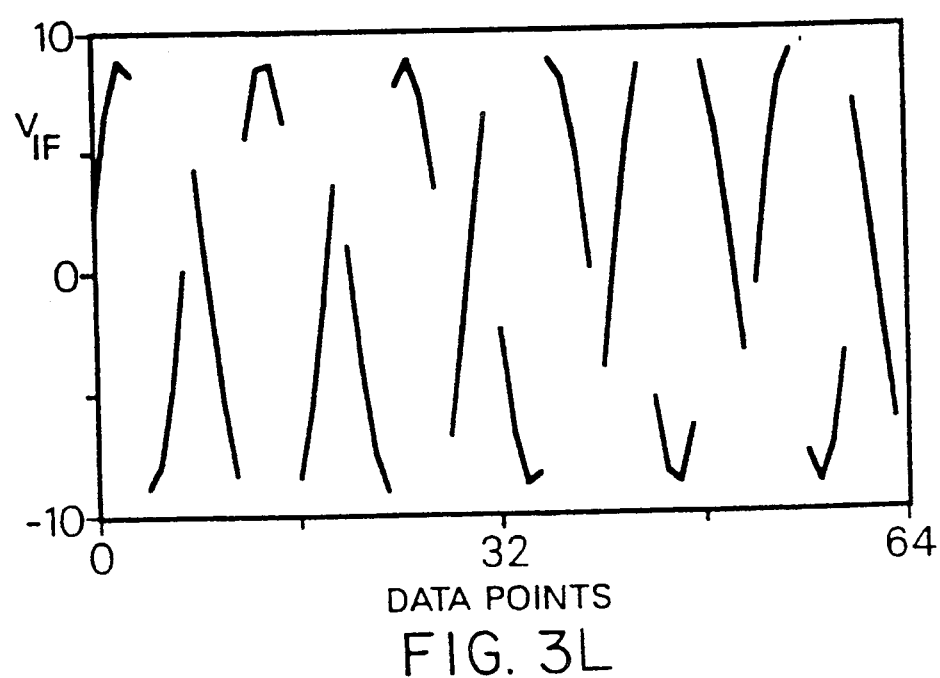
Figure 3M:
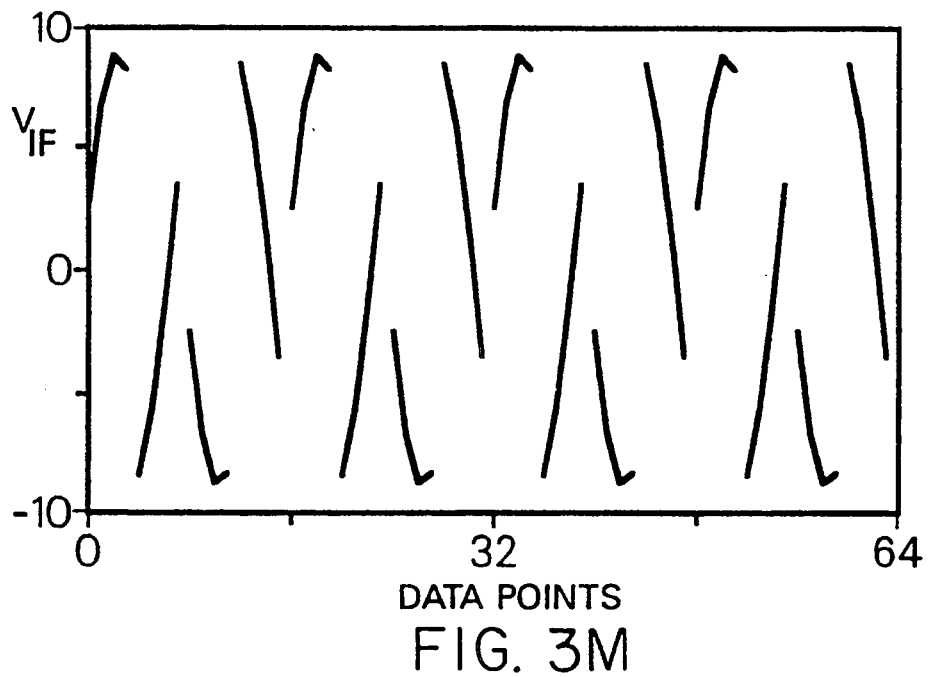
Figure 3N:
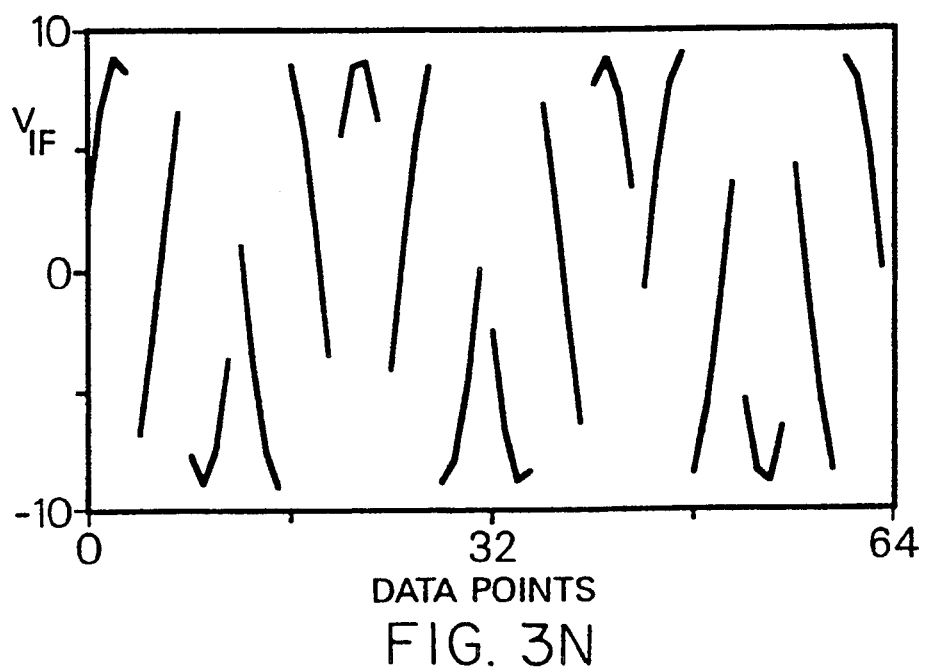
Figure 3O:
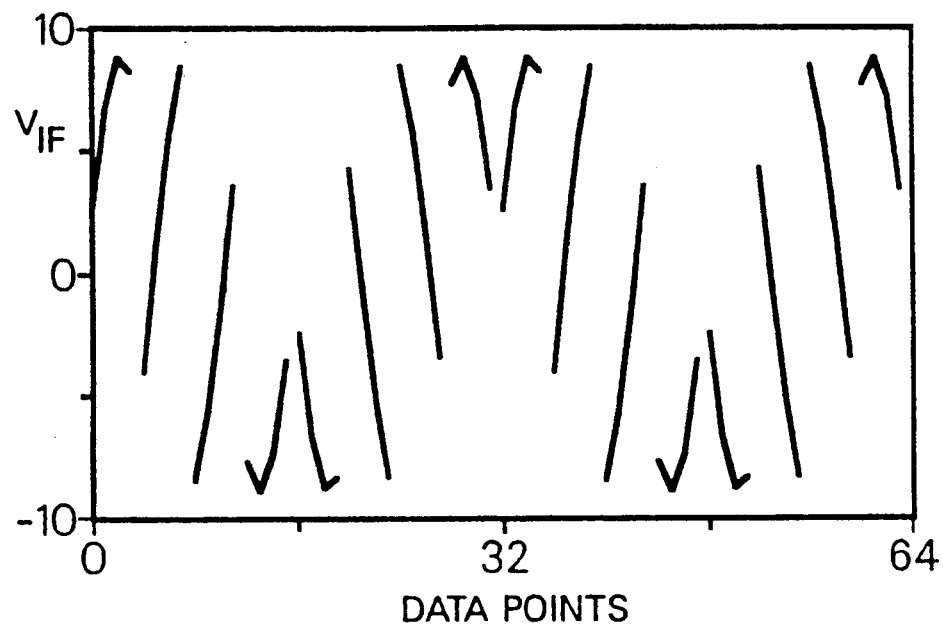
Figure 3P:
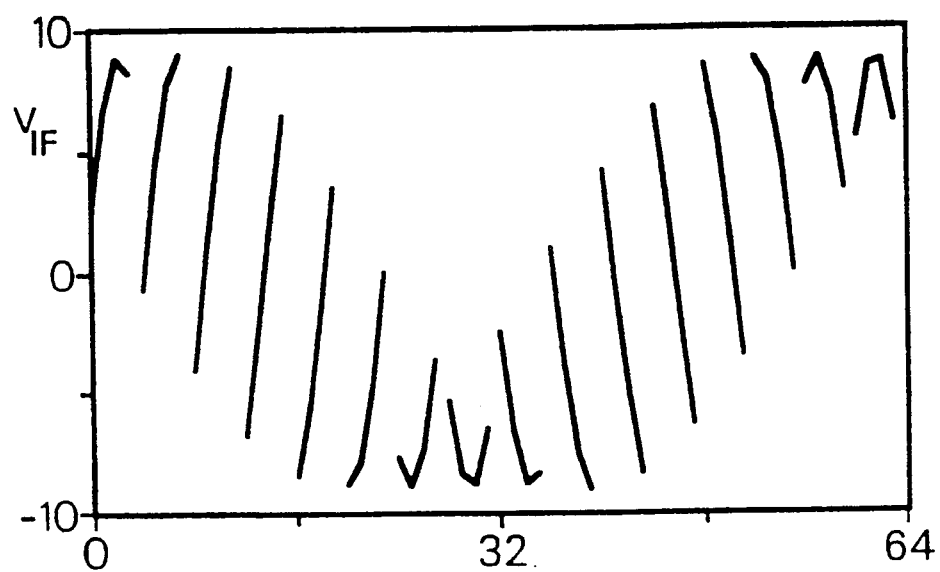

Let us examine what happens when the phase shifter 30 changes the phase in the reference path. For example, if that phase change is 180°, then the phase difference between the RF and reference signals at the mixer 26, signals at points 32 and 37, changes by 180° and the position of the output vector shifts by a ½ cycle. A phase-shift occurs at each of the VCO frequencies. Correspondingly, the angular range of the output vector will again be ⅜ of the cycle, but beginning at the ½ cycle point. See FIG. 2 for a graphical illustration.

Therefore, as we continuously repeat the VCO sequence of 4 frequencies and change the phase by 180° during alternate segments, the output vector will rotate uniformly and continuously.

Since we have the required condition of a uniformly and continuously rotating vector, the principle of vector decomposition, i.e., the Fourier transformation, can be applied to deduce the target distance even in the presence of other targets.

To summarize this new case, let us define a phase sequence as two successive frequency sweeps. There are two possible phase sequence arrangements. (There will be a total of 8 data points, each associated with a given phase and frequency.) In the first arrangement, the phase remains zero in both frequency sweeps, while in the second the phase increases by 180°. In the former instance, only the targets at 10′, 20′, 30′, etc. cause the associated output vectors to rotate 2, 4, 6, etc. complete revolutions per phase sequence. Analogously in the second instance, only the targets at 5′, 15′, 25′ etc. cause the associated output vectors to rotate 1, 3, 5, etc. complete revolutions per phase sequence.

Therefore, I have developed a method by which the apparatus is able to resolve a target with 5′ accuracy, i.e., a factor of two improvement. The trade-off is that the apparatus needs to measure and analyze twice as much data.

The above method can be extended for a larger number of phase steps, resulting in an additional improvement. In general, the improvement factor is equal to the number of phase steps. If $n_p$ is the number of steps, then the range accuracy is:

$$\Delta r = c/\{2n_p(f_{max}-f_{min})\}$$

For an example, in the present embodiment the number of phase states is 16. A phase sequence consists of 16 frequency sweeps. There are a total of 16 phase states in the sequence arrangement. Let us designate each of them (0), (1), (2), ..., (9), (A), (B), ..., (F) (using hexadecimal notation). For instance, in the sequence −0 the phase increment for each successive frequency sweep is zero, as the output data are measured. For sequences −1, −2 and −3 the increments are 22.5°, 45° and 67.5°, respectively, and so on. Each of the corresponding data sequence must be analyzed for a different set of target locations, which will cause the output vectors to rotate one or more full revolutions per sequence. Table 1 below demonstrates this example.

TABLE 1

| Sequence designation | Phase increment | Targets with complete cycles | No. of cycles |
| --- | --- | --- | --- |
| −0 | 0° | 0', 10', 20' etc. | 0, 16, 32, etc. |
| −1 | 22.5° | .625', 10.625', etc. | 1, 17, 33, etc. |
| −2 | 45° | 1.25', 11.25', etc. | 2, 18, 34, etc. |
| ... | ... | ... | ... |
| −4 | 90° | 2.5', 12.5', etc. | 4, 20, 36, etc. |
| ... | ... | ... | ... |
| −8 | 180° | 5', 15', etc. | 8, 24, 40, etc. |
| ... | ... | ... | ... |
| −F | 337.5° | 9.375', 19.375', etc. | 15, 31, 47, etc. |

Digital Processing

Figure 4A:
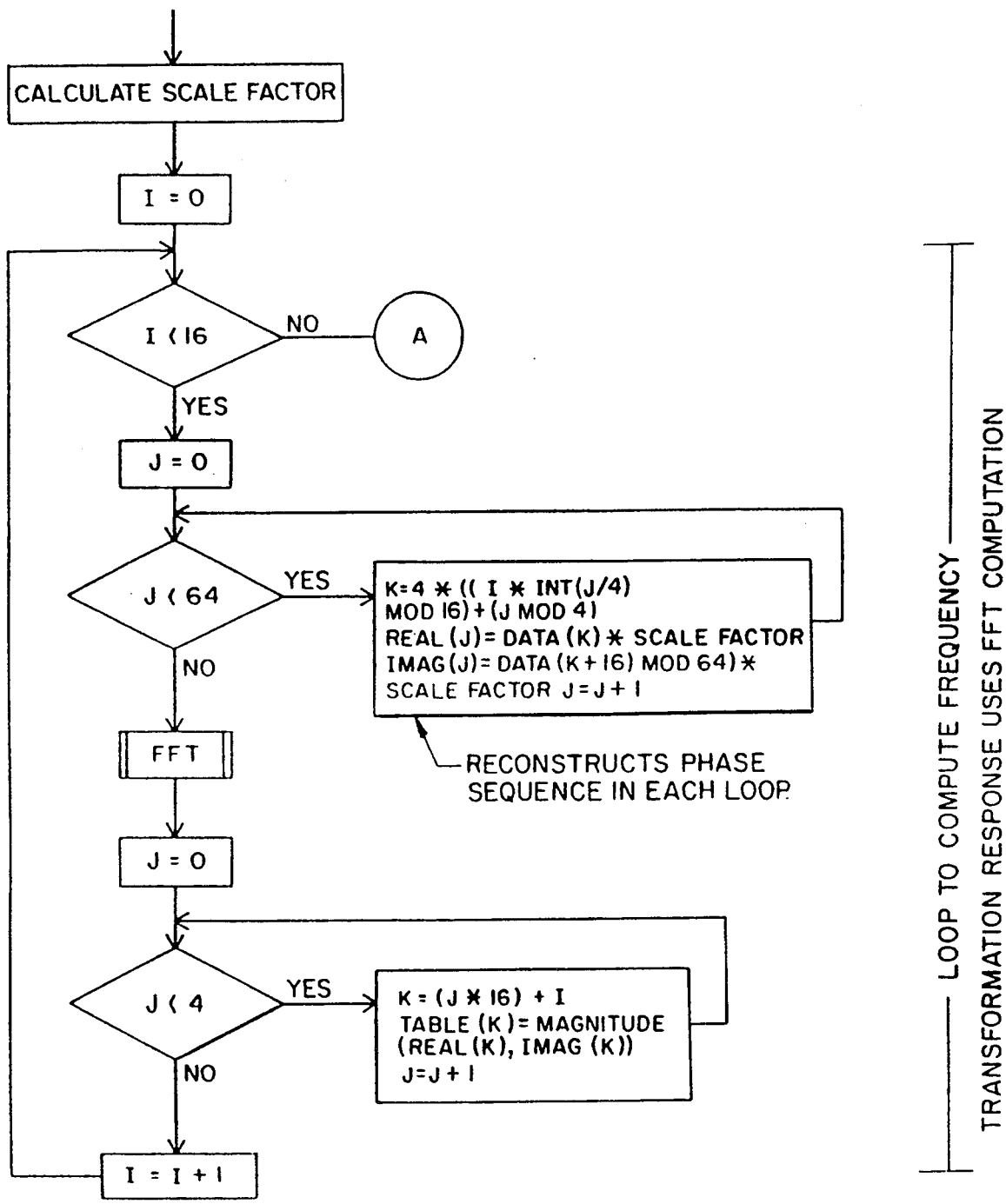
FIGS. 4A and 4B are computer flow charts of the data processing performed including the frequency transformation and distance calculator.

The fast fourier transform (FFT) processes the data digitally. The measured data are samples of the signal produced at the output port 39 of the mixer 26. One data sample is acquired for each frequency and phase state. There are a total of 4 frequencies and 16 phase states, or 64 points, which are stored in a 1-dimensional array. DATA (I), I=0, ..., 63. As can be deduced from Table 1 above, the phase sequence −1, generates all 64 combinations of frequencies and phases. Therefore, this sequence −1 is the only one performed during the measurements. The other sequences are then reconstructed in the computer processing. FIG. 4A shows the flow chart which computes the frequency transformation response of FIG. 5. As each of the phase sequences is reconstructed, the Fourier transform FFT is applied; only 4 points of the 64 FFT-output points are required. These are indicated in the 4th column in Table 1 above. These 4 points are stored in an array TABLE (k), k=0, ..., 63 (FIG. 4A). After 16 repetitions of the main loop, output array TABLE (k) is filled; a typical plot of TABLE (k) array is shown in FIG. 4A, where the magnitude of each data point is shown.

Figure 4B:
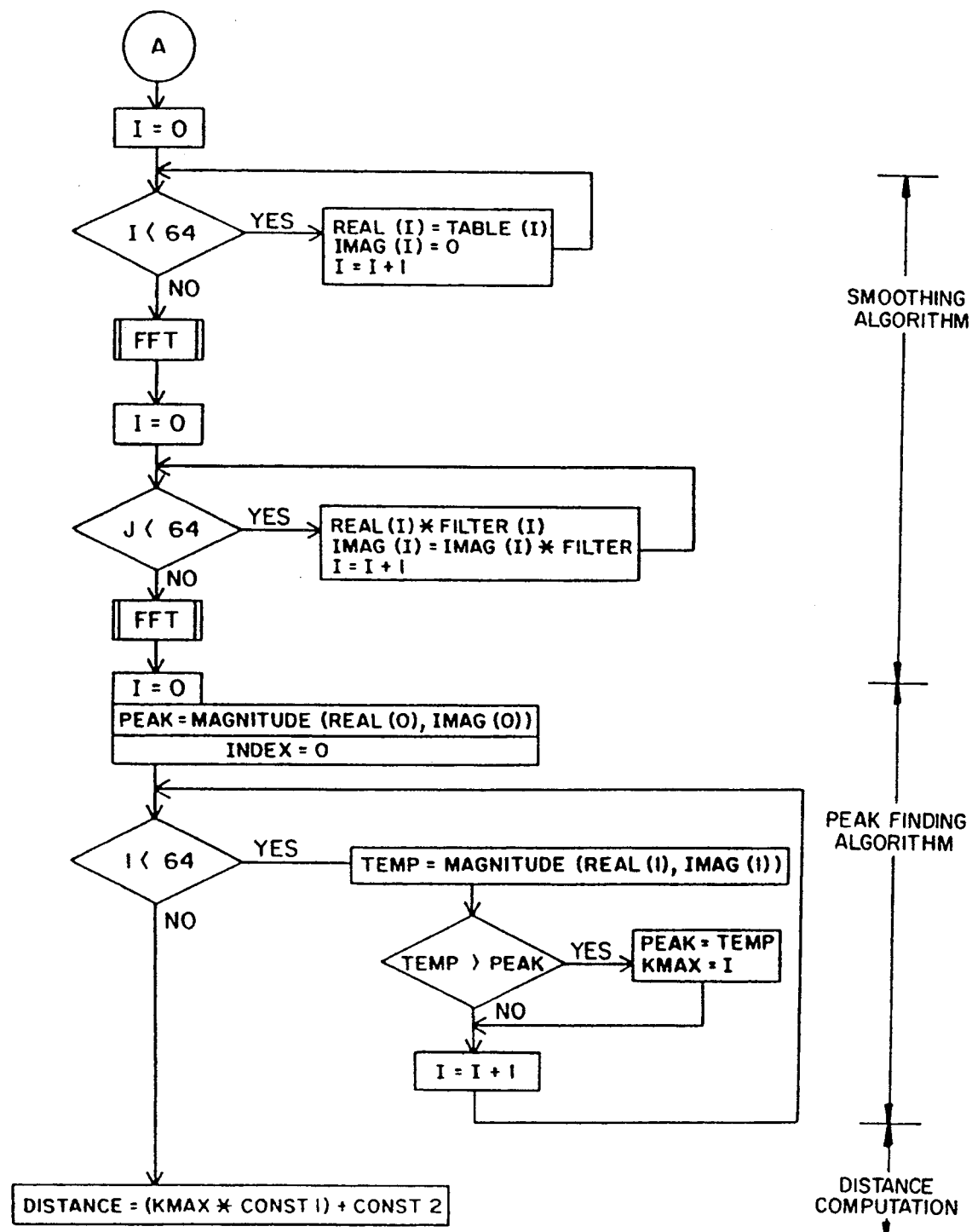

The magnitude of the RF signal received at the antenna can have a large variation, depending on the reflection of the target and its distance. For weak RF signals, random interference may be superimposed on the measured data and the computed curve may not be as smooth as one shown in FIG. 5. It will have narrow spikes resulting in the "false" peaks. It is therefore necessary to "smooth" the data stored in the array TABLE (k) of FIG. 4A by applying a smoothing algorithm, which is indicated in the flow chart in FIG. 4B. The smoothing algorithm is based on widely known work (by R. B. Blackman and J. W. Turkey, "The Measurement of Power Spectra", Dover 1958) using FFT routines. Finally, a peak finding algorithm is performed to determine index $k_{max}$ at which the peak of the frequency transformation occurs. Finally, the target distance is computed; a suitable formula is set forth below (see Appendix, equation 16).

In a present embodiment of the system, the number of phase states $n_p=16$. For each of the phase states, the voltage controlled oscillator 12 generates four frequencies $f_0$, $f_0+df$, $f_0+2df$, $f_0+3df$, where $f_0=10.5$ GHz and $df=12.5$ MHz. Each time a new frequency is generated, a voltage at the IF port 39 of the mixer 26 is digitally sampled (measured) and stored in the computer's RAM memory; a total of 64 measured data points are sampled and stored. FIGS. 3-A through 3-P are set to 16 graphs (numbered O to F) each formed of the real portion of the 16 corresponding phase sequences developed in the reconstruction processing loop of the calculations process of FIG. 4A.

A typical example of a set of 64 data points is shown in FIG. 3-A. The graph is divided into 16 segments. Each segment represents a subset of 4 data points (connected for clarity by a continuous curve).

Therefore, the first segment of the graph is a measured response at 4 frequencies when the phase shifter 30 is in state 0°. The second sequence is another response at the same 4 frequencies when the phase shifter 30 is in state 22.5°.

Each subsequent segment corresponds to a response for 4 frequencies ($f_0$, $f_0+df$, $f_0+2df$ and $f_0+3df$), as the phase is increased by 22.5°. The complete wave form is a set of 16 segments and is designated as phase sequence −1. The number of the sequence conveniently designates that in this phase sequence, the phase state between subsequent segments is increased by one least significant bit, LSB, (22.5°). The other 15 phase sequences, as shown in FIGS. 3-B through 3-P, are computer reconstructed from data contained in the phase sequence −1. Again, the phase sequence −0 to −F refer to LSB increments of the phase shift between subsequent segments.

The target range can be visually obtained by examining the 16 graphs for the sinusoidally continuous response and counting the number of full sinusoidal cycles. In this example phase sequence −5 meets the criteria with 5 complete cycles. This number of complete cycles directly relates to the target range and is used for visual analysis of graphs. Machine processing via FFT (FIG. 4A) performs a similar analysis.

A computer efficient method is to apply FFT to each of the 16 wave forms (phase sequences). FFT produces 64 complete data output points. FFT output of phase sequence −1 produces data for 1, 17, and 33 etc. according to Table 1.

Figure 5:
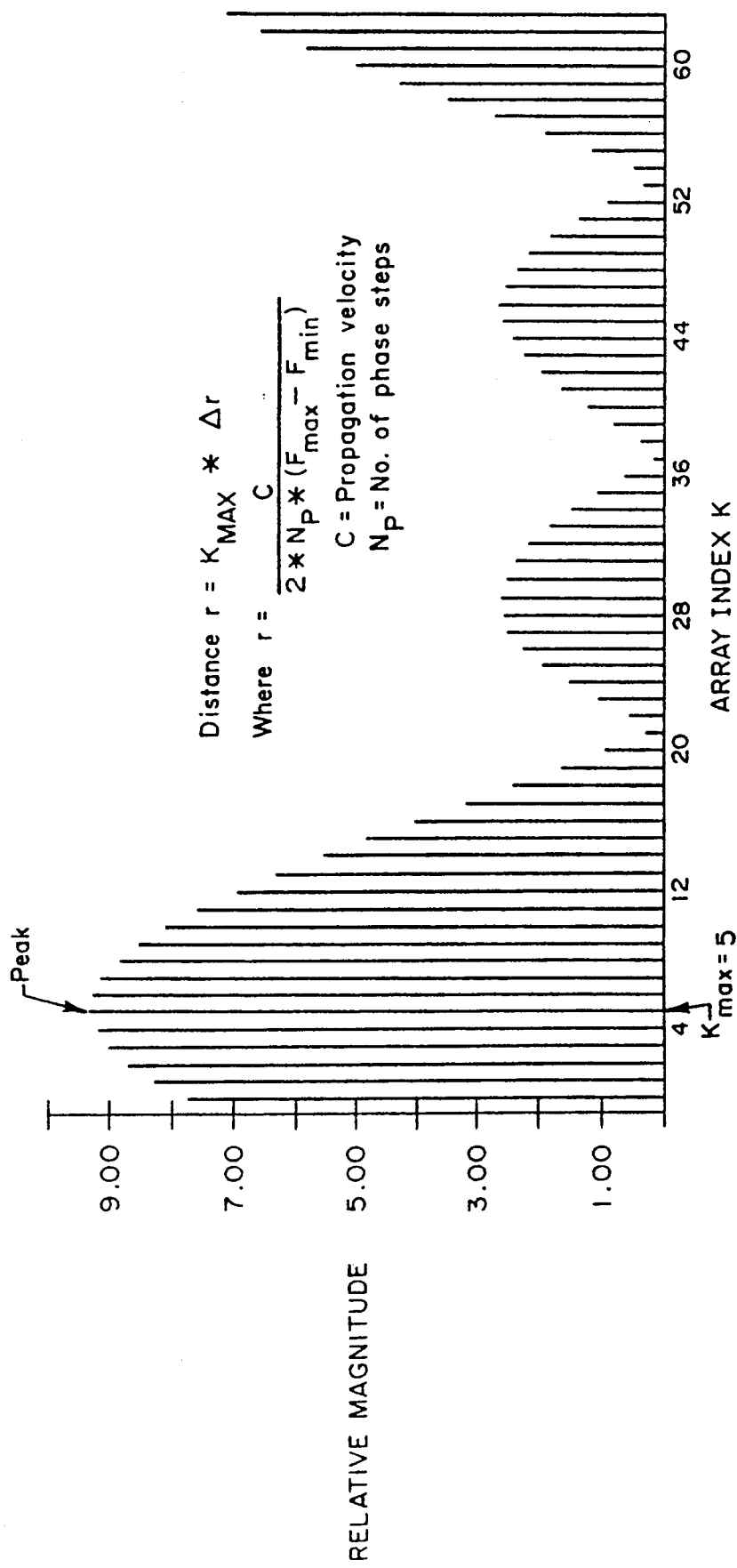
FIG. 5 is a graphical diagram of a table of data illustrating the operation of the distance calculator of FIG. 1

The resultant set of 64 points produces a curve as shown in FIG. 5. The position of the peak is related to the target distance.

The voltage controlled oscillator 12 can generate either a continuous range or a discrete set of frequencies. In the former arrangement, the system can measure obstacle range from zero to infinity, being limited only by the strength of the echo signal.

The advantage of the latter case is that the system can be made significantly simpler and therefore cheaper. However, because of the finite number of frequency steps, the range measurement has an unambiguity range:

$$R_u = c \cdot n_f / (2\Delta f_m)$$

In the present embodiment, where the number of frequencies is four and the bandwidth is 50 MHz, the unambiguous range is 40 feet. To overcome this ambiguity problem, the system operates in two modes. In one of the modes, so called far-looking mode, the modulation bandwidth is 12.5 MHz, resulting in 160 feet of unambiguous range. It is reasonable to expect that an echo signal from an obstacle past 160 feet will always be negligible compared to the signal received from an obstacle within the initial 20 foot range.

The resolution in this far-looking mode is 2.5 feet. If a target is detected within 20 feet, the system switches to the near-range high resolution mode, using a modulating bandwidth of 50 MHz with a resolution of 0.625 feet. In both of these modes the number of generating frequencies is only four.

Single Antenna Implementation of Narrow Band Ranging Radar

Figure 11:
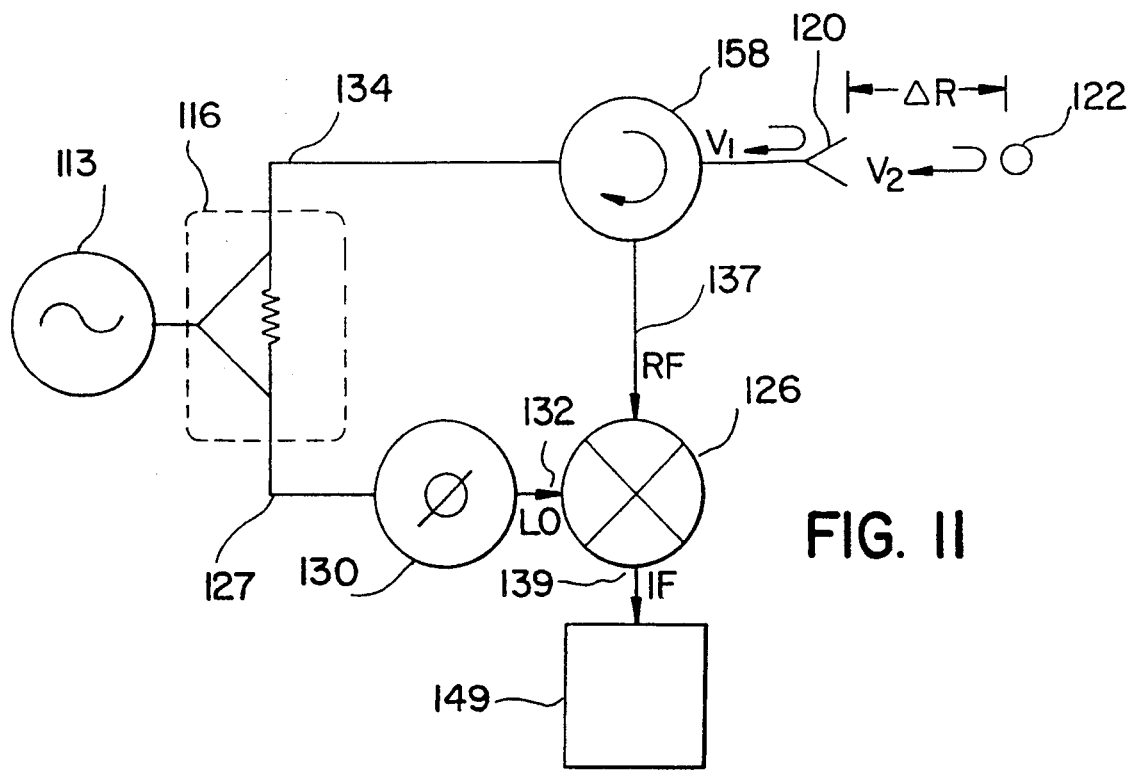
FIG. 11 is a schematic diagram of a typical monostatic radar system.

A typical state-of-the-art monostatic radar system is depicted in FIG. 11. Oscillator 113 generates a continuous wave RF signal with a periodic frequency modulation. Power splitter 116, e.g., a Wilkenson power divider, divides the RF signal between output ports 127 and 134. Phase shifter 130 is a 2-port device that can change the phase of the RF signal. The phase shifter 130 provides an RF reference signal to a mixer 126. The reference signal is applied to the LO port 132 of mixer 126. The RF signal is radiated by an antenna 120, however a portion of the RF signal is reflected back from the antenna 120. Energy ($v_2$) reflected by the target 122 and intercepted by the antenna 120 is fed to the RF port 137 of the mixer 126. A circulator 158 ensures a maximum coupling of the transmitted energy from oscillator 113 to the antenna 120 and of the received energy from the antenna 120 to the RF port 137 of the mixer 126, and a minimum coupling (isolation) between the oscillator 113 and the mixer 126. An alternative arrangement may employ a coupler instead of the circulator 158. Receiver or detector 149 determines the range ($\Delta R$) to the target 122.

In analyzing the monostatic system of FIG. 11, consideration must be given to the reflection from the target 122 and the interaction with the antenna reflection ($v_1$). The signal voltage at RF port 137 equals the combined reflection voltage from the antenna and the target.

$$v_{RF} = v_1 + v_2$$

In practice, the situation is more complex since a number of sources of reflection and leakage energy are present. However, the solution to a single false (undesirable) reflection case can be easily extended to the case of multiple reflections.

Using conventional FM-CW techniques, the location of the target can be determined, provided that either, (a) the time delay difference between the antenna 120 and target reflection is greater than the inverse of the effective bandwidth, i.e., $$\Delta \tau = \frac{2}{c} \Delta R > \frac{1}{B}$$

where $\Delta \tau$=time delay, c=the speed of light, $\Delta R$=range or the distance from the antenna to the target, and B=the effective bandwidth; or, (b) the RF voltage at the RF port 137 of the mixer 126 due to target reflection is significantly larger than that of the antenna reflection, i.e., $$v_2 > v_1$$

where $v_1$=the antenna reflection signal, and $v_2$=the target reflection signal. Using the narrow band phase shifter technique requires only that $$v_2 > v_1$$

A typical microwave antenna reflects between 1% and 10% of the voltage incident upon it, while the RF voltage due to the target reflection, at the RF port 137 of the mixer is anywhere between <0.01% to 1%. Clearly, this does not satisfy the preceding inequality.

Figure 12:
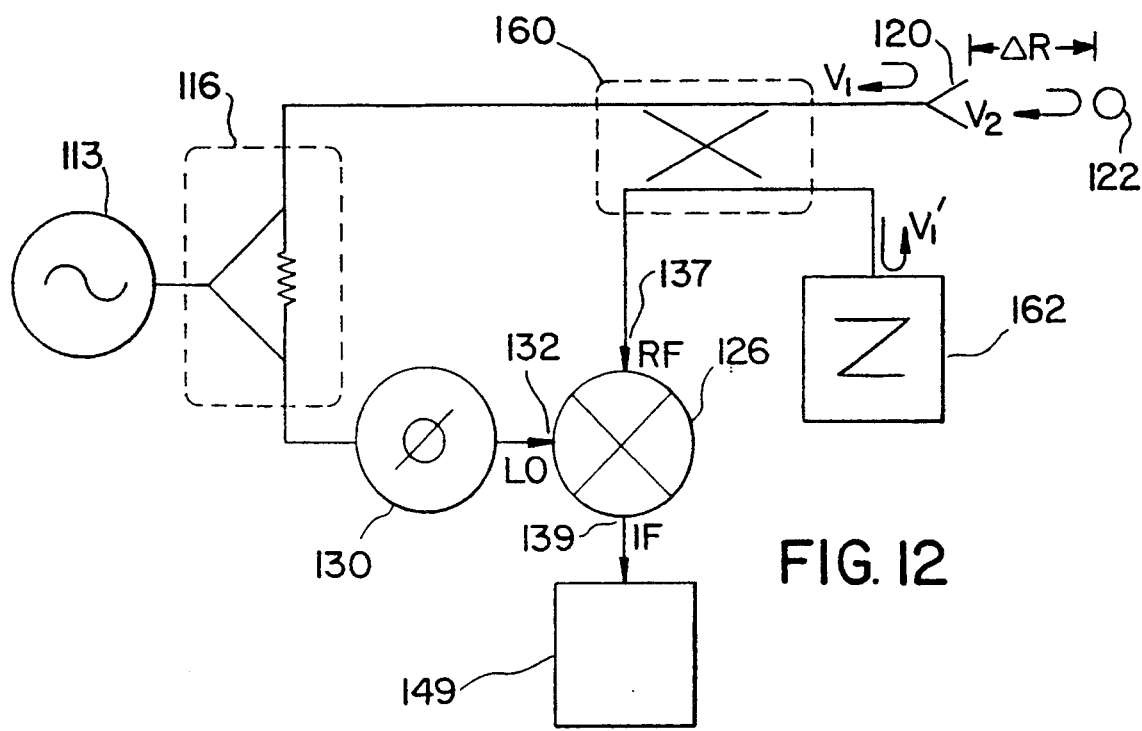
FIG. 12 is a schematic diagram of a monostatic radar system embodying the one-port Z-matching device of this invention.

One embodiment of the present invention is shown in FIG. 12. The corresponding components of the monostatic radar system shown in FIG. 12 have the same reference numerals as the components in FIG. 11. A coupler 160 is utilized instead of circulator 158. A one-port I/Q modulator or Z-network 162 is connected to one port of the coupler 160. The Z-network 162 is an active matching device. The Z-network 162 "generates" a voltage $v_1'$ at the RF port 137 of the mixer 126 that has an equal magnitude and opposite sign to that of the antenna reflection voltage $v_1$. Since RF voltage is characterized as a vector quantity, the Z-network must be capable of both amplitude and phase control of the reflected signal. Generally, the antenna reflection will be a function of frequency and temperature; therefore, it is preferred that the Z-network be adjusted accordingly.

Figure 13:
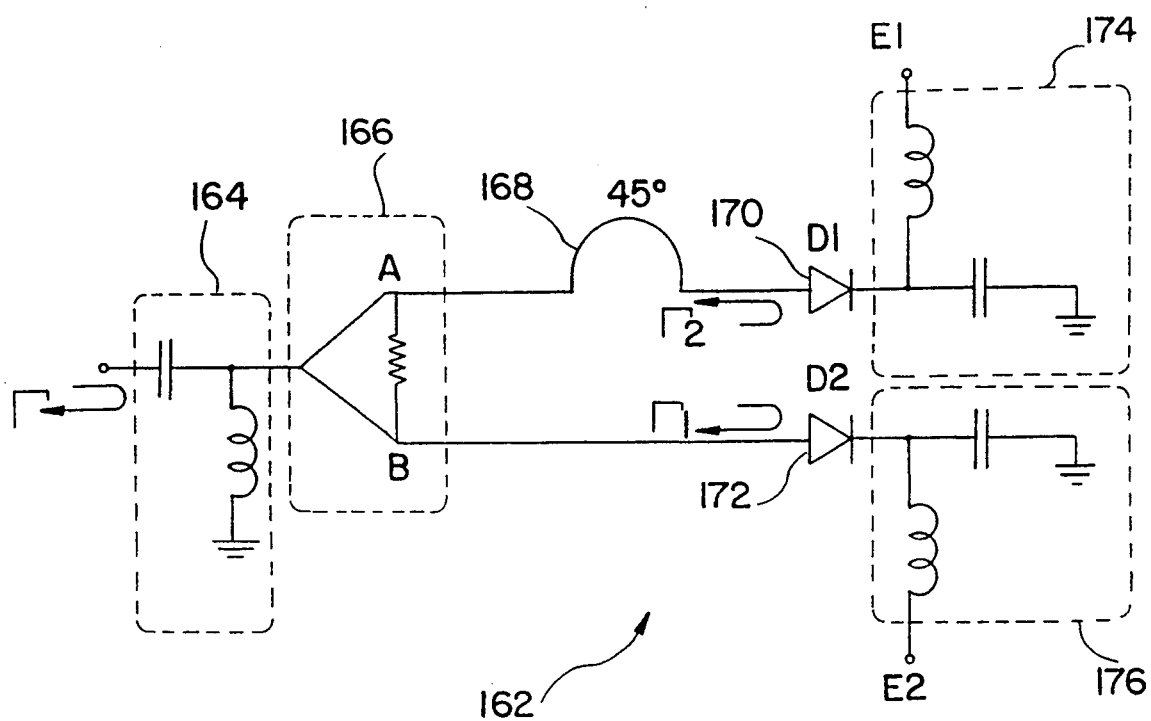
FIG. 13 is a schematic diagram of the temperature uncompensated design of the one-port Z-matching device.

One embodiment of the Z-network is shown in FIG. 13. The Z-network 162 is composed of a bias circuit 164, a power divider 166, a 45°-phase shifter 168, diodes 170, 172, and bias circuits 174, 176. A one-port I/Q modulator is by definition a reflective device, and is characterized by a complex reflection coefficient $\Gamma$. The Z-network 162 "receives" the incident signal from the oscillator 113 via the coupler 160 and reflects a pre-determined portion of that incident signal with a pre-determined phase change. Ideally, the range of the amplitude of the reflected signal should be between 0 and 1, and the range of the phase should be between 0° and 360°.

Bias circuit 164 provides DC ground for the bias currents. Power divider 166 splits the incident signal into two parts. A quadrature coupler can be substituted for the power divider 166. One of the split signals must go through a 90° phase shift. This can be done by introducing a 45°-phase shifter 168 into one of the paths. The phase of the signal is shifted 45° during each traversal of the path.

Each part of the split signal is reflected from a variable resistive termination. The variable resistive termination can be properly biased PIN diodes 170, 172 or GaAs FETs or other smaller devices. The magnitude of the reflected signals $\Gamma_1$, $\Gamma_2$ is determined by the resistance of the termination. Nominally, the phase of the reflection will be a function of resistance except for the 180° reversal when the resistance of the termination moves through a value equal to the characteristic impedance of the system. The reflections are recombined in a quadrature manner (because of the two-way traversal of the 45°-phase shifter 168 in one path) to provide an I-Q relation between the two independently controlled reflections, i.e., $$\Gamma = \Gamma_1 + j\Gamma_2$$

Diodes 170, 172 are appropriately biased at each operating frequency and at each phase state of the phase shifter, if necessary, by bias circuits 174, 176, respectively. The proper bias conditions are determined by minimizing the IF signal at IF port 139 in the absence of a target.

Since the diode resistance is highly temperature sensitive, the reflection coefficient $\Gamma$ in FIG. 13 will also be temperature dependent. This is an undesirable condition. The Z-network 162 shown in FIG. 14a significantly reduces the temperature dependence of $\Gamma$. Bias circuit 180 removes unwanted RF interference. Power divider 182 evenly splits the incident signal between two paths. A 45°-phase shifter 184 provides the necessary 90° phase shift to one of the split signals. Parasitic conditions and temperature can be compensated for by introducing a quadrature coupler and an additional variable termination in each path. The product of the resistances of diodes 188 and 190 must equal the square of the characteristic impedance of the quadrature coupler 186. Similarly, the product of the resistances of diodes 198 and 200 must equal the square of the characteristic impedance of quadrature coupler 196. This condition is achieved by applying the following bias voltages:

$$E_1 = E_0 + V_1$$

$$E_1 = E_0 - V_1$$

$$E_2 = E_0 + V_2$$

$$E_2 = E_0 - V_2$$

Figure 14A:
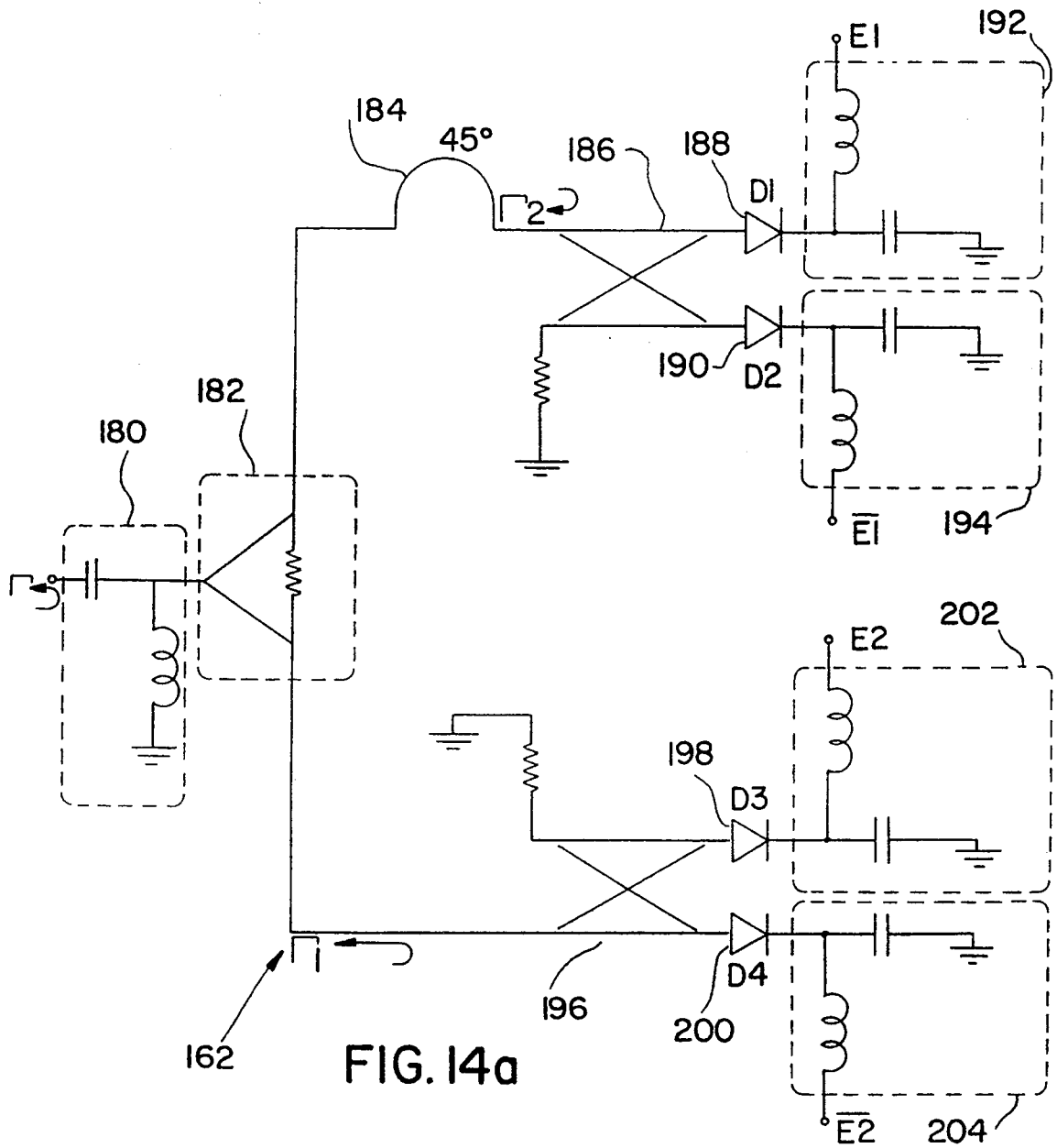
FIG. 14a is the parasitic and temperature compensated design of the one-port Z-matching device.
Figure 14B:
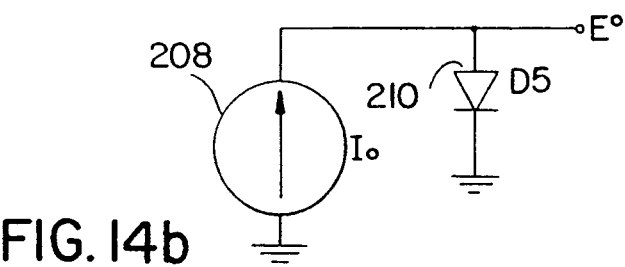
FIG. 14i b is the temperature compensated voltage generator.

A voltage generating circuit, shown in FIG. 14b, consisting of a current generator 208 and PIN diode 210 produces voltage $E_0$ (the voltage across diode 210 biased by a current $I_0$). Current generator 208 has a $T/T_0$ temperature dependence.

$$I_0[T] = I_0[T_0] \cdot \frac{T}{T_0}$$

Where T is the ambient temperature or system temperature in °K., and $T_0$ is room temperature in °K.

$V_1$ is a DC control voltage with $T/T_0$ temperature dependance which controls the magnitude and sign of the reflection $\Gamma_1$ via the following temperature independent relationship:

$$\Gamma_1 = a \, \mathrm{Tan} \, h(bV_1)$$

where a and b are physical constants. A similar relationship holds for $V_2$. In the preferred embodiment, diodes 188, 190, 198, 200, and 210 should be lot matched. The article *Broadband Phase Invariant Attenuator*, Adler, D. and Maritato, P., delivered at the IEEE International Microwave Symposium, 6/1988, provides a complete description of the biasing circuit; this article is herein incorporated by reference in this application.

Temperature dependence of transmission line phase velocity must also be taken into account. However, its effect is not as pronounced as that of the diodes' resistance. The transmission line temperature variation can be absorbed into the temperature variation of the antenna reflection coefficient.

The Z-network 162 of FIG. 14a is calibrated in the absence of any target, for each phase state $i_p$ and frequency step $i_f$. The DC voltages $V_1[i_p, i_f]$ and $V_2[i_p, i_f]$ are determined by requiring the IF voltage at port 139 lie within a predetermined range. For $n_p$ and $n_f$ steps there are a total of $n_p \times n_f$ voltages of $V_1$ and $V_2$. This procedure compensates for frequency variations of the antenna and phase shifter interaction at temperature $T_0$.

Over the temperature range, the temperature dependance of current $I_0$ maintains the IF voltage within the predetermined range for all voltages $V_1[I_p, i_f]$ and $V_2[i_p, i_f]$ obtained at temperature $T_0$.

Figure 15:
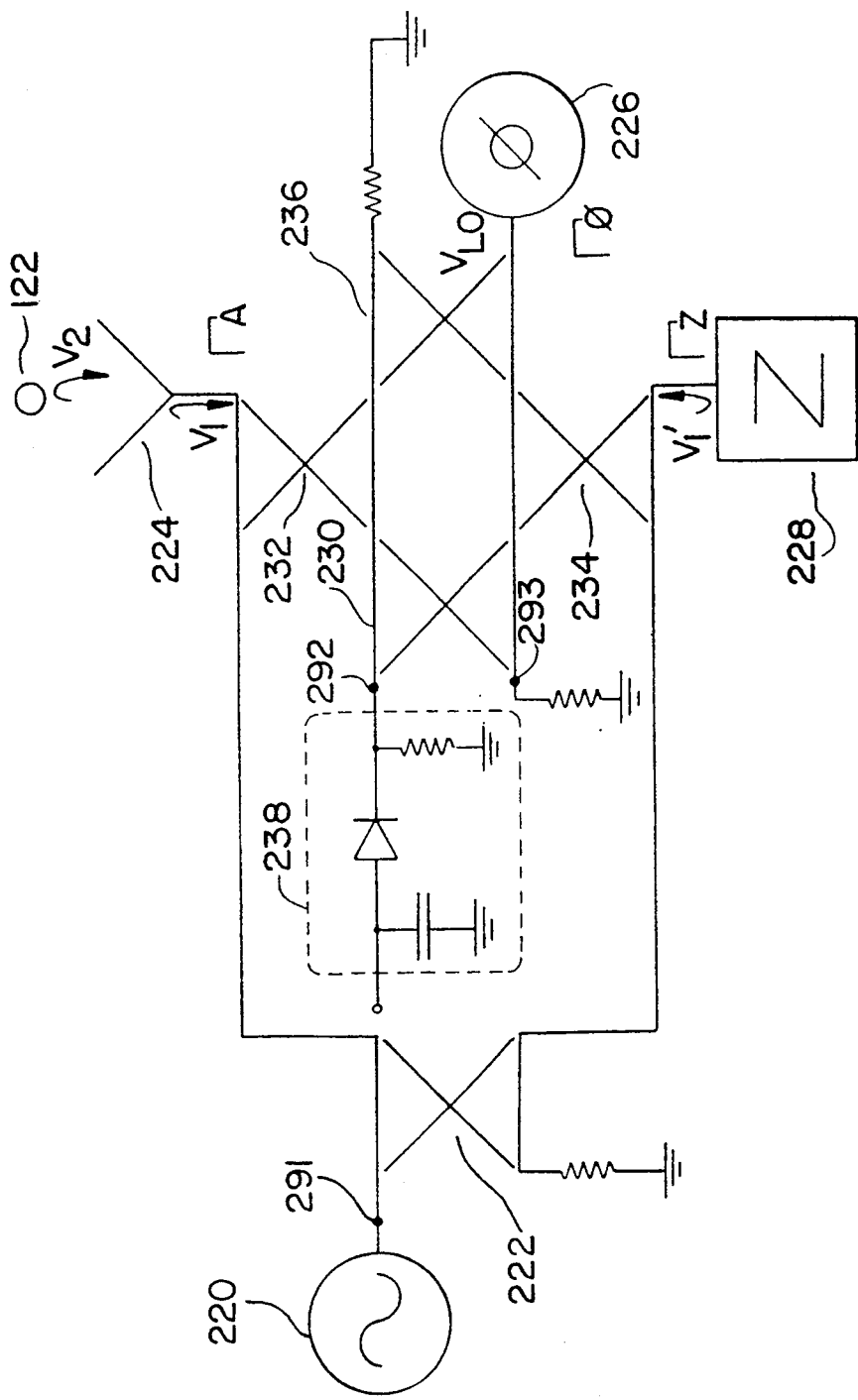
FIG. 15 is the schematic diagram of a balanced monostatic radar system embodying this invention.

An alternative monostatic radar system is shown in FIG. 15. This sytem is a balanced monostatic system since the impedance is symmetrical with respect to the Z-network and the antenna. The components of this balanced monostatic system are similar in function to those in FIG. 12. A 3 dB quadratic coupler 222, with the isolated port terminated, is used to equally divide the RF signal between the antenna 224 and the Z-network 228. This system employs a reflective phase shifter 226. The reference LO signal is directed from port 291 via a coupling structure, including couplers 230, 232, 234 and 236, to a one-port phase shifter 226 and its phase controlled reflection, $V_{LO}$, appears at port 292 as an LO bias signal. The nature of the topology shown eliminates the LO signal at port 293.

The RF signal is not phase controlled by the phase shifter 226. There are three components of the RF signal. A component $v_1'$ is reflected from Z-network 228; $v_1$ is due to antenna reflection; and $v_2$ is due to target reflection. By calibrating the Z-network such that $v_1 = v_1'$, the detector 238 (i.e., a single ended mixer) at port 292 detects a signal due to the target only. The antenna reflection $v_1$ is "dumped" in the termination of port 293.

The significance of this approach is that the whole network structure is symmetrical, and, as a result, the temperature variation of the transmission phase velocity is cancelled. If the antenna reflection is temperature insensitive, as in the case of a waveguide horn, then there is no need for temperature compensation.

There are several shortcomings in this approach. A low-loss one-port phase shifter is not easy to realize. A four-bit phase shifter yielding 16 fold bandwidth reduction is the maximum practical number of bits. For higher resolution, a higher loss I/Q network must be employed which will limit the dynamic range of the system.

The use of single-ended mixer is another disadvantage. Such a mixer is less efficient then a double-balanced mixer used in FIG. 12. In addition, there is a 200–400 mV inherent DC offset. Therefore, an AC coupling scheme should be employed.

Figure 16:
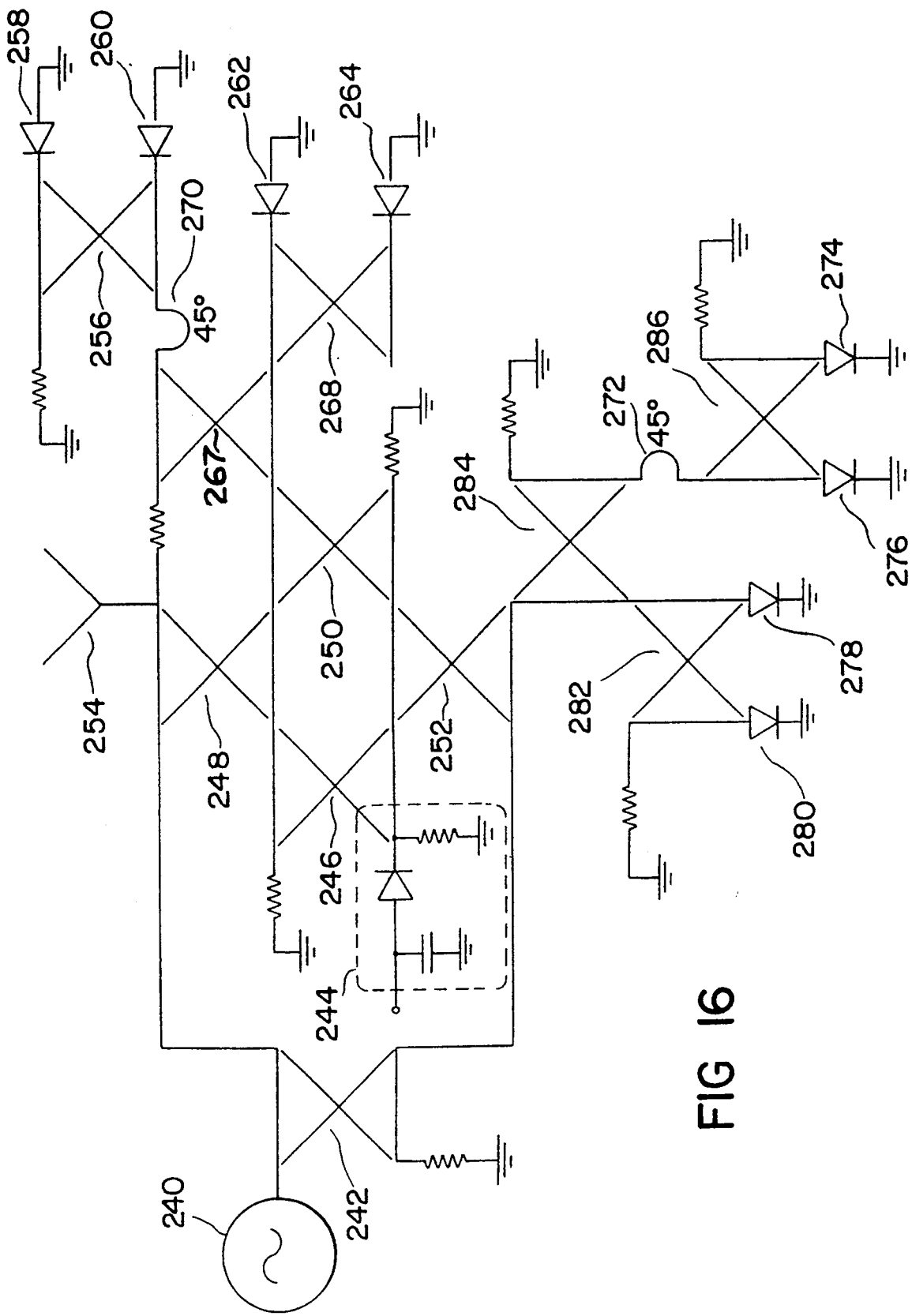
FIG. 16 is the schematic diagram of a balanced monostatic radar system.
Figure 17:
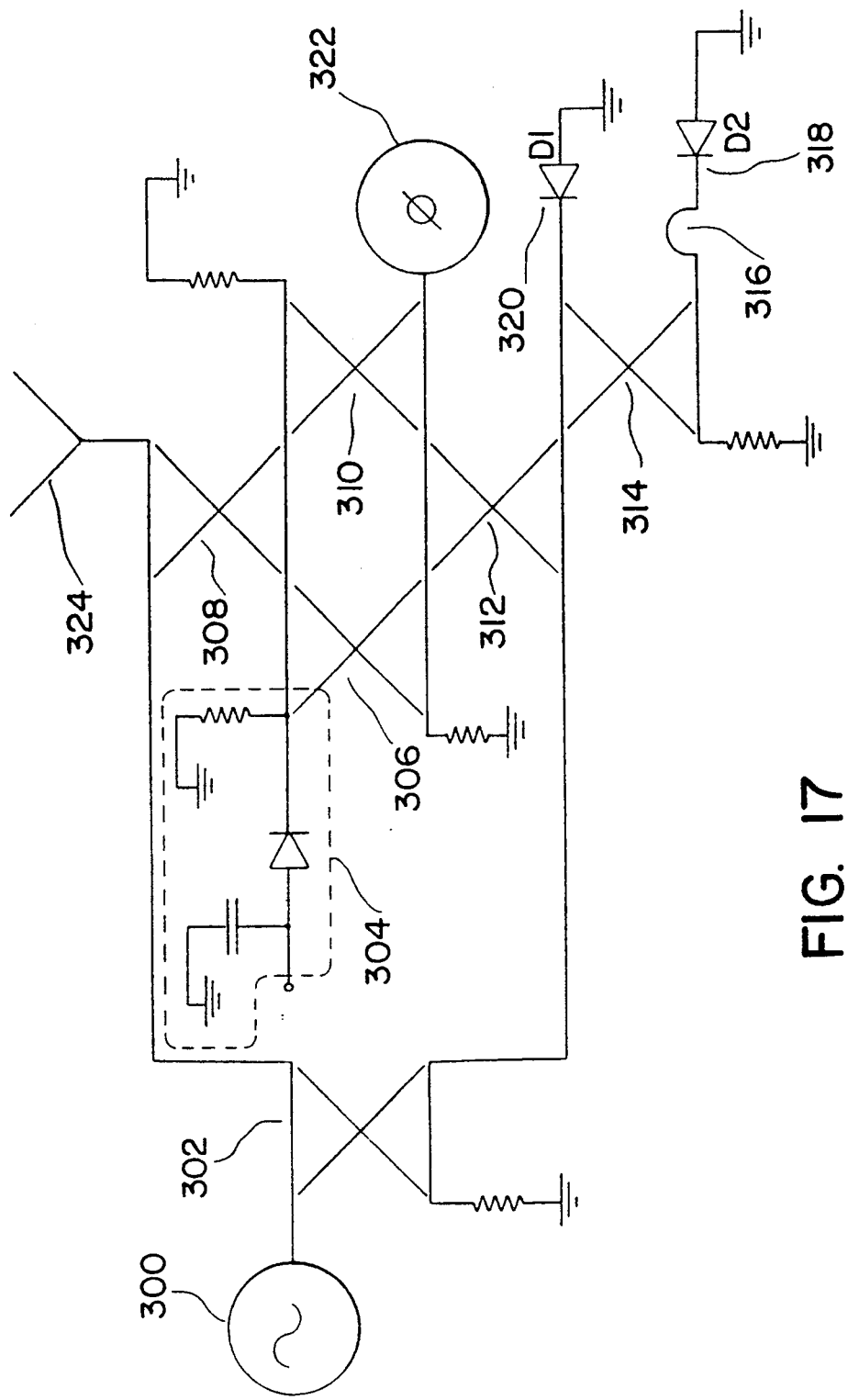
FIG. 17 is a schematic diagram of the monostatic system using an unbalanced Z-matching device.
Figure 18:
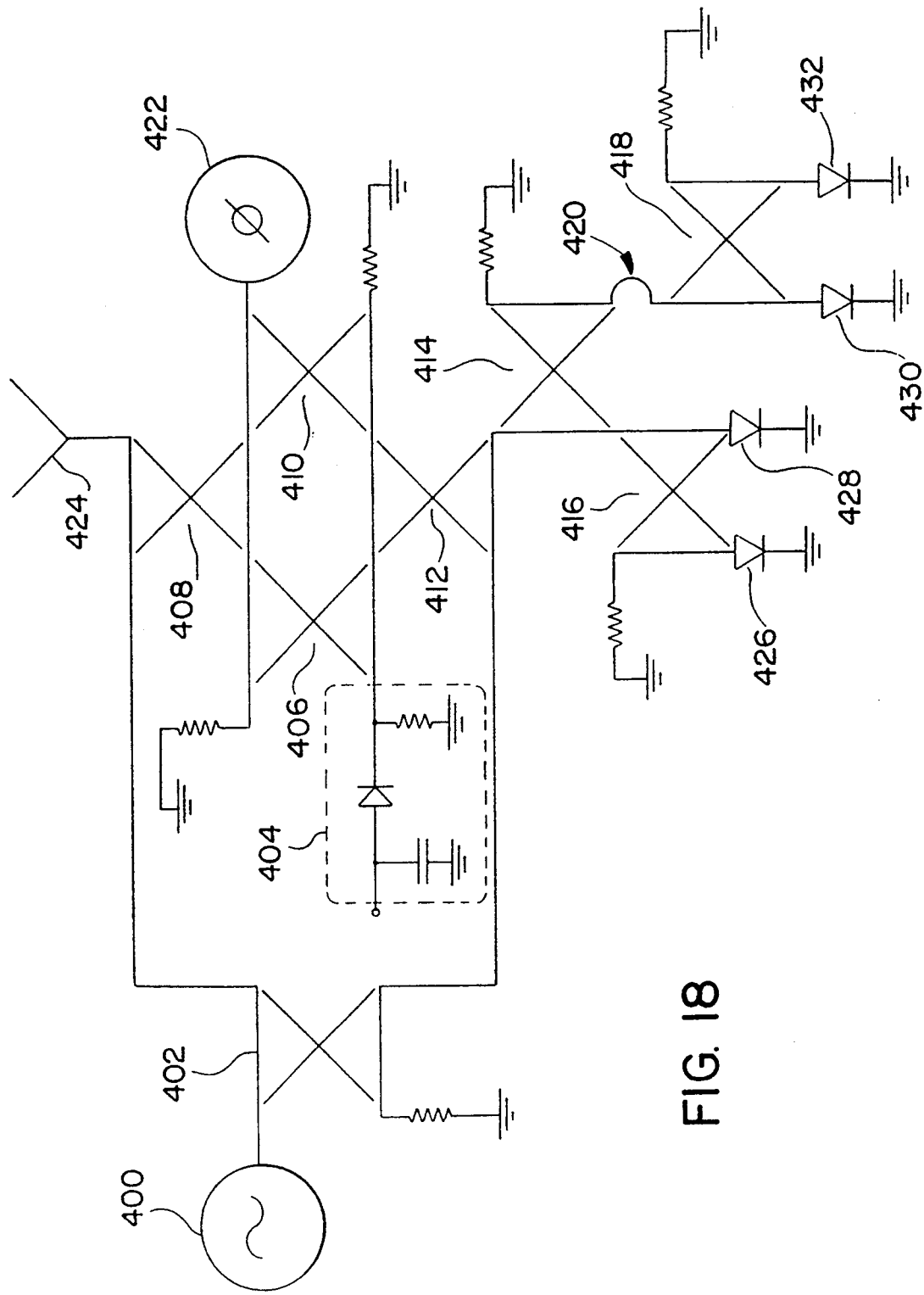
FIG. 18 is a schematic diagram using a temperature compensated balanced Z simulator.

FIGS. 16, 17, and 18 are particular realizations of the topology shown in FIG. 15. FIG. 16 is similar to FIG. 15 but the one port phase shifter and Z-network are realized by means of the one port I/Q network shown. The phase shifter is a balanced reflective phase shifter and includes couplers 256, 267 and 268 each with one port terminated; PIN diodes 258, 260, 262, and 264; and 45° phase shifter 270. Note that the power divider is replaced by a quadrature coupler 267. The Z-network is also balanced and includes couplers 282, 284 and 286 each with a port terminated; PIN diodes 274, 276, 278, and 280; and a 45° phase shifter 272. FIG. 17 shows an unbalanced Z-network which is essentially the Z-network of FIG. 13 with the power divider replaced with a quadrature coupler 314. A temperature compensated balanced Z-network is shown in FIG. 18, which is essentially the Z-network of FIG. 14a with the power divider replaced by a quadrature coupler 414. The Z-network also includes couplers 416 and 418 with one port terminated; PIN diodes 426, 428, 430 and 432; and 45° phase shifter 420.

Figure 19:
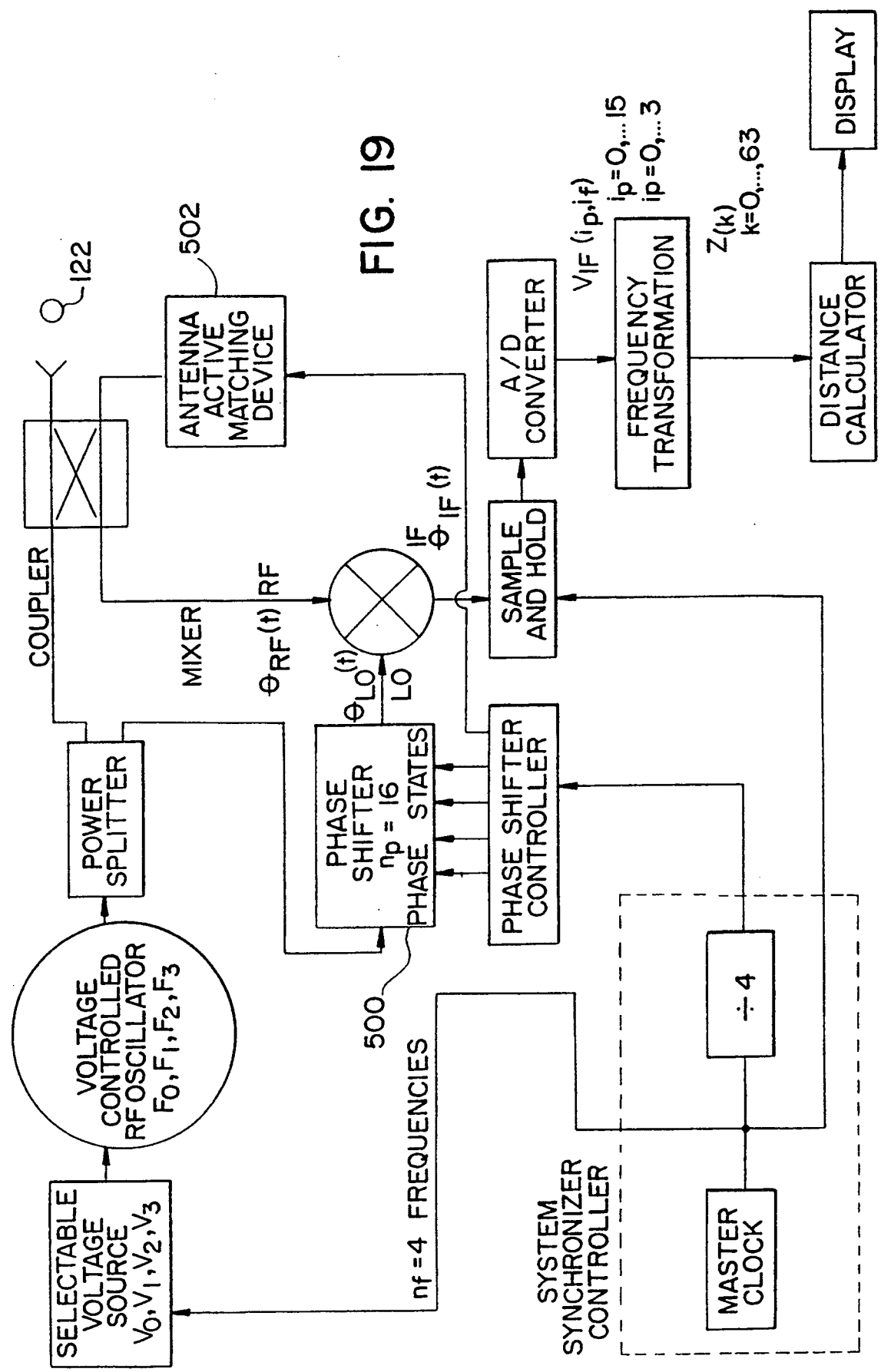
FIG. 19 is a schematic block diagram of a monostatic radar system embodying this invention.

FIG. 19 shows the monostatic radar system incorporating the present invention including a digitally controlled phase shifter 500 and the one-port active Z-network 502 (antenna active matching device).

The foregoing describes a new and improved near range obstacle detection and ranging aid. The invention improves on existing technology to provide a sufficiently high resolution of targets without requiring an increase in bandwidth beyond what is presently available. In addition, multiple targets can be identified.

Applicant has disclosed various forms and modifications of the invention and others will be apparent to those skilled in the art from the concepts set forth above and in the following claims.

The attached Appendix sets forth theoretical bases for this invention and is incorporated herein as a part of the application.

APPENDIX

Narrow-band Radar System With Improved Range Resolution

Overview

The specific problem addressed in a particular automotive application has been to measure the range of a target, (or the closest one in a multi-target environment), with less than *one foot resolution* over a 0 to 20 feet range. Among the various approaches considered, a microwave FM-CW radar has been chosen. It is a mature technology with low cost attributes, adequately suited for the automotive environment and offers many advantages compared to ultrasonic, infra-red or optical techniques. The principal limitation encountered in this approach stems from the restricted operating bandwidth allowed by the FCC for unlicensed radar transmission.[1] At the preferred operating band, nominally at 10.525 GHz, bandwidth is 50 MHz.
[1]FCC section 15 ...

It is known that the inherent range resolution $\Delta r$, is directly related to the radar the allowable bandwidth $\Delta f_m$, i.e.

$$\Delta r \approx \frac{c}{2\Delta f_m} \quad (1)$$

where c is the velocity of propagation, which for electromagnetic energy approximately equals one ft/nsec in free space.[2] This is also referred to as the *critical distance problem*.[3]
[2]D. Wiener, *High Resolution Radars*, Artech House 1987, p. 5.
[3]Skolnik, *Radar Book*, 1972, p. 17.

Thus, for $\Delta f_m = 50$ MHz bandwidth, the inherent resolution according to equation (1) is $\Delta r \approx 10$ feet.

In the most broad sense, the key aspect of an FM-CW system is the measurement of a relative time delay between two coherent frequency-modulated signals. Improved resolution can be achieved by phase modulating, over repeated cycles of frequency modulation, one of the two signals. In so doing, additional time is needed to acquire complete data under all phase conditions. This is an example of the classic time/bandwidth trade-off.

Figure 20:
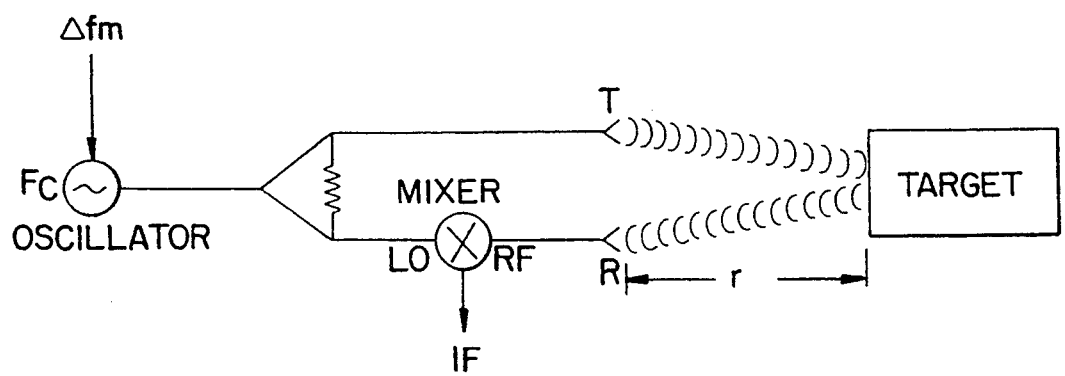
FIG. 20 is a schematic block diagram showing a typical frequency modulated continuous wave (FM-CW) radar system.

A typical FM-CW system is shown in FIG. 20. The LO signal, having a frequency $F_c$, is frequency modulated over a bandwidth $\Delta f_m$. Assuming linearly swept modulation, the instantaneous frequency varies between $F_c$ and $F_c + \Delta f_m B$, over the finite swept period T starting at some arbitrary time, as shown in equation (2).

$$\omega(t) = \omega_c + \frac{\Delta \omega t}{T} \quad 0 \leq t \leq T \quad (2)$$

The parameter of interest is the electrical phase of the oscillator signal $\theta_{LO}$, shown in equation (3) which includes as arbitrary phase $\psi_o$.

$$\theta_{LO}(t) = \int_0^t \omega(t)dt = \omega_c t + \frac{1}{2}\Delta\omega_m \frac{t^2}{T} + \psi_o \quad (3)$$

where $\omega_c = 2\pi F_c$ and $\Delta\omega_m = 2\pi \Delta f_m$

The oscillator signal is split into two parts, for example by means of a power divider as shown in FIG. 20. These signals are then guided through a reference path and a transmission path, respectively. Referring to FIG. 20, the former is the distance between the power splitter and the LO port of the mixer, while the latter is the distance between the power splitter and the RF port of the mixer. In FIG. 20, the transmission path includes a distance 2r, the distance between the transmitting and receiving antennas via the target.

Without the loss of generality, we can treat the problem by assuming that all distances, except the distance 2r, are zero. Therefore it follows that the phase of the reference signal at the LO port of the mixer is also given by equation (3).

The transmitted part of the oscillator signal which travels a distance 2r, is received with a delay $\tau = 2r/c$. Thus the phase of the signal at the RF port of the mixer, $\theta_{ref}$, is related to the phase of the signal at the LO port by equation (4).

$$\theta_{RF}(t) = \theta_{LO}(t-\tau) \quad (4)$$

The function of the mixer in FIG. 20 can be characterized as phase comparison. Thus, if the LO and RF signals are sinusoidal waveforms with constant amplitude, then the waveform at the IF port is also a sinusoidal function whose phase, $\theta_{IF}$, equals the difference between the phases of the LO and RF signals, or $$\theta_{IF}(t) = \psi_1 + \frac{\Delta\omega\tau t}{T} \quad 0 \leq t \leq T \quad (5)$$

where $\psi_1$ is a time independent constant phase and the second term represents the IF frequency term proportional to the delay $\tau = 2r/c$.

Some observations about the nature of the IF signal:
1. The IF signal is a periodic function.
2. Therefore all of the available data can be acquired over the period T.
3. Evidently, in the single target case, the delay $\tau$ can be measured directly from the phase response, by determining the total phase change between the beginning and the end of the sweep period T. The measured resolution would be limited only by the capability of a phase discriminator employed. However, in a multiple target situation, the direct phase measurement produces large errors.
4. If the product $\Delta f_m \tau$ is an integer, the IF output will be a continuous sinewave. Otherwise it will be a repetitive discontinuous train of sinewave segments. In the former case, the output phase is swept over a full $2\pi n$ range. In the latter case, at least one phase cycle is incomplete. It is evident from equation (5) that the phase constant $\psi_1$ defines which part of the $2\pi$ cycle remains incomplete.

5. In the frequency domain, the IF signal, as a consequence of paragraph 1, above, is a discrete function with its harmonic components being 1/T apart.

6. For each harmonic there is a corresponding discrete location of a target with a delay $\tau_k = k/\Delta f_m$, where $k=0,1,2\ldots$ is the appropriate harmonic number.

7. If k in above is not an integer then the frequency domain response to such a target will be two or more harmonics.

8. It follows, that the resolution is limited by the condition $\Delta f_m \tau = 1$, which confirms equation (1).

Modified FM-CW approach

Figure 21:
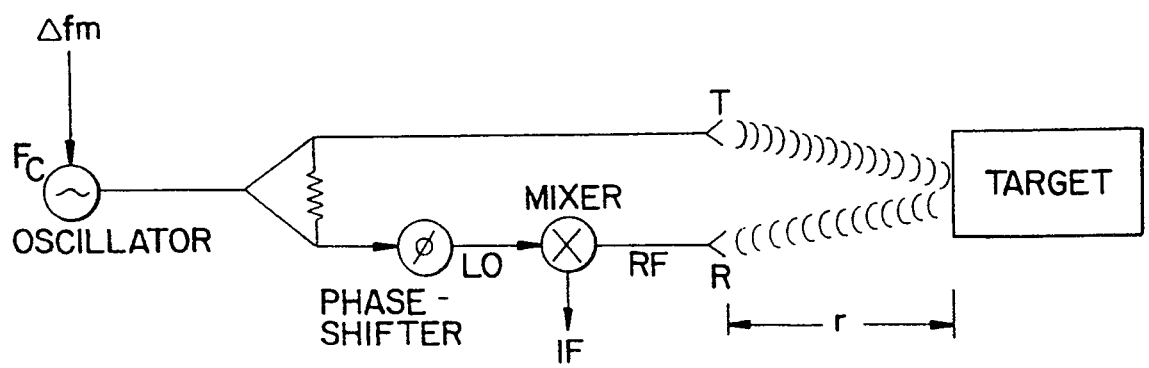
FIG. 21 is a schematic block diagram showing a modified frequency modulated-continuous wave (FM-CW) radar system.

The key aspect in the modified FM-CW system is the inclusion of a variable $2\pi$ phase-shifter in one of the two signal paths, stepping through $n_p$ discrete phase states over repeating cycles of frequency modulation. The phase of the phase-shifter $\psi_{LO}(t)$ has a time varying nature with a period $n_p T$, since the period of the frequency modulation cycle is T. In FIG. 21, the phase-shifter is shown as being in the reference path. It can be readily shown that the phase of the IF signal is similar to that of equation (5), except it includes phase $\psi_{LO}(t)$ of the phase-shifter, i.e.

$$\theta_{IF}(t) = \psi_1 + \psi_{LO}(t) + \frac{\Delta\omega\tau t}{T} \quad (6)$$

For each sweep period T, the phase at the LO port is changed in $n_p$ steps.

Several observations can be made:

1. The IF signal has a period of $n_p T$.
2. It follows that in the frequency domain the discrete frequencies are separated by $1/n_p T$.
3. Thus the necessary condition for improved resolution exists.
4. The range resolution is given by $$\Delta r = \frac{c}{2\Delta f_m n_p} \quad (7)$$

For example, by using 4 bit phase-shifter, $n_p = 16$, the resolution for $\Delta f_m = 50$ MHz would be, according to equation (7), 0.625 ft.

Digital Signal Processing

In this approach the IF signal is sampled with $n_f$ samples per frequency sweep. Consequently the frequency modulation cycle of the oscillator can have $n_f$ discrete frequencies. However, because of the finite number of frequency steps, the range measurement has an unambiguity range $R_u$, readily shown to be $$R_u = \frac{cn_f}{2\Delta f_m} \quad (8)$$

With $n_p$ phase states per each frequency sweep, the total number of acquired data over a period $n_p T$ is $$n = n_p n_f \quad (9)$$

Each of the n data has a unique pair of frequency and phase indexes $i_p$, and $i_f$. These data are designated as $v(i_p, i_f)$. Let us define a transformation of $v(i_p, i_f)$ as follows $$Z(k) = \sum_{i_p=0}^{n_p-1} W^{n_f i_p k} \sum_{i_f=0}^{n_f-1} W^{-i_f k} \{v(i_p, i_f) + jv(i_p k + n_p/4, i_f)\} \quad (10)$$

where $W = e^{-j\frac{2\pi}{n_p n_f}}$ $v(i_p, i_f)$ $i_p = 0, 1, \ldots, n_p-1$ and $i_f = 0, 1, \ldots, n_f-1$ ($n_p n_f$ total), is a set of acquired data points, defined to be periodic, equation (11).

$$v(i_p + mn_p, i_f) = v(i_p, i_f) \text{ for } m = \text{any integer} \quad (11)$$

It can be shown that, for a single target, the magnitude of the transformation, shown in equation (10), leads to a sin(x)/x response.

An alternative form of equation (10) can be obtained by defining a new index i.

$$i = i_p n_f + i_f \quad (12)$$

Then equation (10) reduces to $$Z(k) = \sum_{i=0}^{n-1} W^{ik} u(i) \quad (13)$$

where $u(i) = v(i_p k, i_f) + jv(i_p k + n_p/4, i_f)$

Note that $u(i+mn) = u(i)$ for m = any integer.

Range Determination

Let $k_{max}$ be an index number of the Z(k) transformation such that $$|z(k_{max})| = \max |Z(k)| \text{ for } 0 \leq k \leq n-1 \quad (14)$$

In other words, $k_{max}$ is the index of the complex array Z(k), for which the magnitude of Z(k) is maximum. Then the time delay $\tau = 2r/c$ is related to the index $k_{max}$ by equation (15).

$$\tau = k_{max}\Delta r = \frac{k_{max}}{\Delta f_m n_p} \quad (15)$$

Cable Correction

In practice the distance of the reference path contains cable or similar transmitting media with a known time delay $T_{ref}$. Similarly, the transmission path includes cables between the power splitter and transmitting antenna, as well as between the receiving antenna and the RF port of the mixer, having known time delays $\tau_a$ and $\tau_b$. It follows that $$r = k_{max} \text{ const1} + \text{const2} \quad (16)$$

where $\text{const1} = \frac{c}{\Delta f_m n_p}$ and $\text{const2} = c(\tau_{ref} - \tau_1 - \tau_2)$ Leakage Correction In a practical system one or more leakage paths may exist between the RF and LO ports of the mixer. When measuring a target with a weak echo signal, a stronger leakage signal may cause significant errors. Since the transformation of equation (13) has a commutative property, we can generate a corrected signal $u_{corr}(i) = u(i) - u_{cal}(i)$, which is to be used in equation (13). The signal $u_{cal}(i)$ is measured when no targets are present. Alternatively, we can measure $u_{cal}(i)$ even in the presence of targets, if both antennas are replaced by a matched load. In this case, however, the external leakage between the antennas cannot be corrected and therefore will limit the useful dynamic range of the target echo.

Multiple Targets

Let us assume that a total of L targets is present. We have L transmitting paths of different lengths. Due to each transmitting path there is an associated signal $v_1(i)$ and transform $Z_1(k)$ for each target $l=1,2, \ldots L$. It is readily seen from the commutative properties of (10) or (13) that the combined effect of all targets results in transform $Z(k)$ such that $$Z(k) = \sum_{l=1}^{L} Z_l(k) = \sum_{l=0}^{n-i} W^{ik} \sum_{l=1}^{L} u_l(i) \quad (17)$$

Since each transformation $Z_1(k)$ is $sin(x)/x$ function, the combined transform is a summation of L such function having maxima shifted with respect to each other with varying magnitudes of the maxima. Some analysis as well as experimental measurements indicate several aspects:

1. For targets which produce about equal signals at the receiving antenna and are separated by several units of $\Delta r$, the measured range will be an average of two target distances.

2. For Targets which produce unequal signals at the receiving antenna and are separated by several units of at, the measured range will be a distance corresponding to the distance of the stronger target.

3. For Targets which produce about equal signals at the receiving antenna and are separated by many units of $\Delta r$, the range of both targets can be obtained from the measurements.

4. For Targets which produce unequal signals at the receiving antenna and are separated by many units of $\Delta r$, the range of the stronger targets is obtained accurately. The discrimination of the weaker target is possible, provided the magnitude of its signal is within 10 dB of the stronger signal.

In a particular automotive environment, we are always interested in a closest target. Since signal strength decreases 12 dB each time the target distance is doubled, we directly benefit from range discrimination of farther targets.

I claim:

1. An monostatic radar system of the type including a transmit path for carrying a signal from a signal generating means to a combined signal radiating and detecting means for radiating a primary portion of the generated signal at a target and a receive path for carrying a portion of the radiated signal which is reflected from the target from the radiating and detecting means to a processing means for analyzing the target reflected signal, the transmit and receive paths having a common branch from the radiating and detecting means to a branch point where the transmit and receive paths diverge into separate path portions, a secondary portion of the generated signal being reflected by the radiating and detecting means within the common branch to the separate path portion of the receive path, the improvement comprising:

means for directing a tertiary portion of the generated signal to a cancelling signal producing means;

said cancelling signal producing means producing a cancelling signal of amplitude substantially equal to and of opposite phase to the secondary signal portion by controlled reflection of said tertiary portion of the generated signal; and a coupler structure having means for combining said cancelling signal with the signals being carried by the receive path at a point which is beyond the common branch of said transmit and receive paths whereby the reflected secondary signal portion is substantially cancelled from the signal being carried by the separate path portion of the receive path to the processing means.

2. An monostatic radar system according to claim 1 wherein an antenna comprises the combined signal radiating and detecting means a four-port coupler comprises said coupler structure, the four-port coupler having:

a first port and a second port coupling the separate portion of the transmit path to the common transmit and receive path branch;

said second portion and a third port coupling the common transmit and receive path branch to the separate portion of the receive path; and a fourth port which in conjunction with said third port comprising said combining means.

3. An monostatic radar system as defined in claim 1, wherein said cancelling signal producing means is an active matching device.

4. An monostatic radar system as defined in claim 1, wherein said cancelling signal producing means is a one-port I/Q modulator.

5. An monostatic radar system as defined in claim 4, wherein said I/Q modulator comprises:

means for splitting said tertiary signal into two paths and combining a pair of reflected signals from said two paths;

a first variable resistive means termination terminating the first path wherein said first reflected signal is produced;

means for phase shifting said split portion of said tertiary signal in the first path and said first reflected signal by a selected amount; and a second variable resistive termination terminating the second path wherein said second reflected signal is produced.

6. An monostatic radar system as defined in claim 5, wherein said splitting and combining means is a quadrature coupler.

7. An monostatic radar system as defined in claim 5, wherein said first and second variable resistive terminations are a pair of matched pin diodes, and which further includes means for biasing said pin diodes.

8. An monostatic radar system as defined in claim 5, wherein said I/Q modulator is temperature compensated.

9. An monostatic radar system as defined in claim 8, wherein said first and second variable resistive terminations each include a quadrature coupler coupled to a pair of matched diodes which provides temperature compensation for the reflected signals.

10. An monostatic radar system as defined in claim 1, which further comprises means for calibrating the cancelling signal producing means responsive to a correcting signal which includes:

means for providing a reference signal for said generated signals;

means for comparing said reference signal to the vector sum of the secondary reflected signal portion and said cancelling signal wherein said comparing means produces the correcting signal.

11. An monostatic radar system as defined in claim 10, wherein said comparing means is a mixer.

12. An monostatic radar system signals comprising:
means for generating high frequency energy signals;
antenna means for radiating said high frequency energy signals and for receiving reflected target signals whereby a secondary portion of said high frequency energy signals, which are not radiated, reflects from said antenna means;
means for processing received reflected target signals;
a one-port Z-network for receiving an incident signal from said high frequency energy signals and for producing a cancelling signal by controlled reflection of said incident signal; and
a coupling structure coupling said signal generating means, said antenna means, said signal processing means, and said one-port Z-network such that the said Z-network produces a cancelling signal which substantially cancels the reflected secondary portion of the high frequency energy signals.

13. An monostatic radar system as defined in claim 12 wherein said coupling structure comprises a four-port coupler.

14. An monostatic radar system as defined in claim 12, wherein said one-port Z-network is balanced.

15. An monostatic radar system as defined in claim 12, wherein said Z-network comprises:
means for splitting said incident signal into two paths and combining a pair of reflected signals from said two paths;
a first variable resistive means termination terminating the first path wherein said first reflected signal is produced;
means for phase shifting said split portion of said incident signal in the first path and said first reflected signal by a selected amount; and
a second variable resistive termination terminating the second path wherein said second reflected signal is produced.

16. An monostatic radar system as defined in claim 15, wherein said Z-network is temperature compensated.

17. An monostatic radar system as defined in claim 16, wherein said first and second variable resistive terminations each include a quadrature coupler coupled to a pair of matched diodes which provides temperature compensation for the reflected signals.

18. A one-port impedance matching device comprising:
a single port for receiving a signal and outputting a controlled reflection of the received signal therefrom;
means, connected to said port, for splitting said received signal into two paths and combining a pair of reflected signals from said two paths;
a first variable resistive means termination terminating the first path wherein said first reflected signal is produced;
means for phase shifting said split portion of said received signal in the first path and said first reflected signal by a selected amount; and
a second variable resistive termination terminating the second path wherein said second reflected signal is produced.

19. An impedance matching device as defined in claim 18, wherein said splitting and combining means is a quadrature coupler.

20. An impedance matching device as defined in claim 18, wherein said first and second variable resistive terminations are a pair of matched pin diodes, and which further includes means for biasing said pin diodes.

21. An impedance matching device as defined in claim 18, wherein said first and second variable resistive terminations each include a quadrature coupler coupled to a pair of matched diodes which provides temperature compensation for the reflected signals.

* * * * *

UNITED STATES PATENT AND TRADEMARK OFFICE
CERTIFICATE OF CORRECTION

PATENT NO. : 5,359,331
DATED : October 25, 1994
INVENTOR(S) : Zdenek Adler

It is certified that error appears in the above-identified patent and that said Letters Patent is hereby corrected as shown below:

At column 1, line 6, prior to "553,890" insert --07/--.

At column 1, line 29, delete "four" and insert therefor --for--.

At column 1, line 59, delete "(FM-CM)" and insert therefor --(FM-CW)--.

At column 3, line 65, delete "FIG. 14i b" and insert therefor --FIG. 14b--.

At column 6, line 8, delete "-" after "converter/".

At column 7, line 56, delete "fourier" and insert therefor --Fourier--.

At column 9, line 30, delete "fourier" and insert therefor --Fourier--.

At column 9, line 51, delete "Fig. 4A" and insert therefor --Fig. 5--.

At column 12, line 1, delete "$v_2 > v_1$" and insert therefor --$v_2 >> v_1$--.

At column 13, line 28, delete "$E_1 = E_0 - V_1$" and insert therefor --$\bar{E}_1 = E_0 - V_1$--.

At column 13, line 32, delete "$E_2 = E_0 - V_2$" and insert therefor --$\bar{E}_2 = E_0 - V_2$--.

UNITED STATES PATENT AND TRADEMARK OFFICE
CERTIFICATE OF CORRECTION

PATENT NO. : 5,359,331

DATED : October 25, 1994

INVENTOR(S) : Zdenek Adler

It is certified that error appears in the above-identified patent and that said Letters Patent is hereby corrected as shown below:

At column 13, line 50, delete "$\Gamma_1 = a \text{ Tan } h(bV_1)$" and insert therefore --$\Gamma_1 = a \text{ Tanh } (bV_1)$--.

At column 14, line 8, delete "$I_p$" and insert therefore --$i_p$--.

At column 15, line 41, prior to "bandwidth" insert --the allowable--.

At column 16, line 35, delete "$\theta_{ref}$" and insert therefore --$\theta_{RF}$--.

At column 18, lines 2-6 delete $$"Z(k) = \sum_{i_p=0}^{n_p-1} W^{n_f i_p k} \sum_{i_f=0}^{n_f-1} W^{-i f k} \{v(i_p k, i_f) + jv(i_p k + n_p/4, i_f)\}$$

$$\text{where } W = e^{-j \frac{2\pi}{n_p n_f}} \text{ "}$$

and insert therefore $$-- Z(k) = \sum_{i_p=0}^{n_p-1} W^{n_f i_p k} \sum_{i_f=0}^{n_f-1} W^{-i f k} \{v(i_p k, i_f) + jv(i_p k + n_p/4, i_f)\} \quad (10)$$

$$\text{where } W = e^{-j \frac{2\pi}{n_p n_f}} \text{ --}$$

UNITED STATES PATENT AND TRADEMARK OFFICE
CERTIFICATE OF CORRECTION

PATENT NO. : 5,359,331
DATED : October 25, 1994
INVENTOR(S) : Zdenek Adler It is certified that error appears in the above-identified patent and that said Letters Patent is hereby corrected as shown below:

At column 18, line 47, delete "$T_{ref}$" and insert therefor --$\tau_{ref}$--.

At column 19, line 30, delete "at" and insert therefor --$\Delta r$--.

At column 19, line 43, delete "a" and insert therefore --the--.

In claim 1, at column 19, line 48, delete "An" and insert therefor --A--.

In claim 2, at column 20, line 11, delete "An" and insert therefor --A--.

In claim 2, at column 20, line 13 after "means" insert --and--.

In claim 2, at column 20, line 19, delete "portion" and insert therefor --port--.

In claim 3, at column 20, line 24, delete "An" and insert therefor --A--.

In claim 4, at column 20, line 27, delete "An" and insert therefor --A--.

In claim 5, at column 20, line 30, delete "An" and insert therefor --A--.

UNITED STATES PATENT AND TRADEMARK OFFICE
CERTIFICATE OF CORRECTION

PATENT NO. : 5,359,331
DATED : October 25, 1994
INVENTOR(S) : Zdenek Adler It is certified that error appears in the above-identified patent and that said Letters Patent is hereby corrected as shown below:

In claim 6, at column 20, line 44, delete "An" and insert therefore --A--.

In claim 7, at column 20, line 47, delete "An" and insert therefore --A--.

In claim 8, at column 20, line 51, delete "An" and insert therefore --A--.

In claim 9, at column 20, line 54, delete "An" and insert therefore --A--.

In claim 10, at column 20, line 59, delete "An" and insert therefore --A--.

In claim 11, at column 21, line 1, delete "An" and insert therefore --A--.

In claim 12, at column 21, line 3, delete "An" and insert therefore --A--.

In claim 13, at column 21, line 25, delete "An" and insert therefore --A--.

In claim 14, at column 21, line 28, delete "An" and insert therefore --A--.

In claim 15, at column 21, line 30, delete "An" and insert therefore --A--.

UNITED STATES PATENT AND TRADEMARK OFFICE
CERTIFICATE OF CORRECTION

PATENT NO. : 5,359,331
DATED : October 25, 1994
INVENTOR(S) : Zdenek Adler

It is certified that error appears in the above-identified patent and that said Letters Patent is hereby corrected as shown below:

In claim 16, at column 22, line 4, delete "An" and insert therefor --A--.

In claim 17, at column 22, line 7, delete "An" and insert therefor --A--.

Signed and Sealed this

Twenty-first Day of February, 1995

Attest:

BRUCE LEHMAN

*Attesting Officer*     *Commissioner of Patents and Trademarks*